(12) United States Patent
Fukuda et al.

(10) Patent No.: US 8,351,434 B1
(45) Date of Patent: Jan. 8, 2013

(54) METHODS AND SYSTEMS FOR DATA COMMUNICATION OVER WIRELESS COMMUNICATION CHANNELS

(75) Inventors: Takayasu Fukuda, San Diego, CA (US); Michael Buyanin, San Diego, CA (US); Alaa Muqattash, San Diego, CA (US)

(73) Assignee: Olympus Corporation, Hachioji-shi, Tokyo (JP)

( * ) Notice: Subject to any disclaimer, the term of this patent is extended or adjusted under 35 U.S.C. 154(b) by 341 days.

(21) Appl. No.: 12/701,377

(22) Filed: Feb. 5, 2010

Related U.S. Application Data

(60) Provisional application No. 61/150,691, filed on Feb. 6, 2009.

(51) Int. Cl.
*H04L 12/28* (2006.01)
*H04L 12/56* (2006.01)
*H04L 12/54* (2006.01)

(52) U.S. Cl. .................. 370/394; 370/278; 370/428

(58) Field of Classification Search .......... 370/276–278, 370/310–350, 394, 428–429
See application file for complete search history.

(56) References Cited

U.S. PATENT DOCUMENTS

| | | | |
|---|---|---|---|
| 6,633,761 B1 | 10/2003 | Singhal et al. | |
| 6,754,228 B1 * | 6/2004 | Ludwig | 370/468 |
| 6,879,567 B2 | 4/2005 | Callaway | |
| 6,975,864 B2 | 12/2005 | Singhal et al. | |
| 7,031,274 B2 | 4/2006 | Sherman | |
| 7,197,308 B2 | 3/2007 | Singhal et al. | |
| 7,400,595 B2 | 7/2008 | Callaway | |
| 7,460,501 B2 | 12/2008 | Sherman | |
| 2003/0161279 A1 | 8/2003 | Sherman | |
| 2004/0258102 A1 | 12/2004 | Callaway | |
| 2005/0058111 A1 * | 3/2005 | Hung et al. | 370/338 |
| 2005/0099985 A1 | 5/2005 | Callaway | |
| 2005/0169209 A1 | 8/2005 | Miu et al. | |
| 2005/0180371 A1 * | 8/2005 | Malkamaki | 370/342 |
| 2006/0002357 A1 | 1/2006 | Sherman | |
| 2006/0039299 A1 * | 2/2006 | Ihm et al. | 370/254 |
| 2006/0104300 A1 | 5/2006 | Ho | |
| 2006/0126847 A1 | 6/2006 | Ho | |
| 2007/0121656 A1 | 5/2007 | Heidari-Bateni et al. | |
| 2007/0184809 A1 | 8/2007 | Muqattash et al. | |

(Continued)

OTHER PUBLICATIONS

Allen Miu, Hari Balakrishnan, and Can Emre Koksal. Multi-Radio Diversity in Wireless Networks, MIT Computer Science and Artifical Intelligence Laboratory, The Stata Center, 32 Vassar Street, Cambridge, MA 02139, pp. 1-26.

(Continued)

*Primary Examiner* — Warner Wong
(74) *Attorney, Agent, or Firm* — Sheppard Mullin Richter & Hampton LLP

(57) ABSTRACT

Systems and methods for improving network performance. A method of transmitting packet data across a network includes a transmitting network device establishing a reservation to transmit traffic to a plurality of wireless receiving network devices across a network; the transmitting network device transmitting a sequence of packets across the network, wherein a packet of the sequence of packets includes data requesting the receivers acknowledge receipt of the packet; the transmitting network device waiting for a predetermined time to receive acknowledgement of receipt of the packet from the wireless receiving network devices; the transmitting network device retransmitting a packet across the network only if it does not receive an acknowledgement for that packet from any of the wireless receiving network devices within the predetermined time.

53 Claims, 20 Drawing Sheets

U.S. PATENT DOCUMENTS

| | | |
|---|---|---|
| 2007/0184870 A1 | 8/2007 | Muqattash et al. |
| 2007/0197186 A1 | 8/2007 | Muqattash et al. |
| 2007/0250872 A1 | 10/2007 | Dua |
| 2008/0002610 A1 | 1/2008 | Zheng et al. |
| 2008/0031177 A1 | 2/2008 | Lee |
| 2008/0056125 A1 | 3/2008 | Kneckt |
| 2008/0080534 A1 | 4/2008 | Lee et al. |
| 2008/0137581 A1 | 6/2008 | Doppler |
| 2008/0151814 A1 | 6/2008 | Jokela |
| 2008/0181154 A1 | 7/2008 | Sherman |
| 2008/0186867 A1 | 8/2008 | Schoo et al. |
| 2008/0233966 A1 | 9/2008 | Scheim et al. |
| 2008/0240112 A1 | 10/2008 | Muqattash et al. |
| 2008/0247366 A1 | 10/2008 | Celentano et al. |
| 2008/0253562 A1 | 10/2008 | Nyberg |
| 2008/0291847 A1 | 11/2008 | Zheng |
| 2009/0007193 A1 | 1/2009 | Correa et al. |
| 2009/0016245 A1 | 1/2009 | Karls |
| 2009/0016273 A1 * | 1/2009 | Kanterakis .................... 370/328 |
| 2009/0028108 A1 | 1/2009 | Sherman |
| 2009/0031035 A1 | 1/2009 | Dharmaraju et al. |
| 2009/0034498 A1 | 2/2009 | Banerjea |
| 2009/0067362 A1 | 3/2009 | Doppler |
| 2009/0109995 A1 | 4/2009 | Alam et al. |
| 2009/0213771 A1 | 8/2009 | Celentano et al. |
| 2009/0252130 A1 | 10/2009 | Sheth et al. |
| 2009/0285189 A1 | 11/2009 | Kim et al. |
| 2009/0323608 A1 | 12/2009 | Adachi et al. |
| 2009/0323667 A1 | 12/2009 | Doi et al. |
| 2009/0323697 A1 | 12/2009 | Celentano et al. |

* cited by examiner

METHODS AND SYSTEMS FOR DATA COMMUNICATION OVER WIRELESS COMMUNICATION CHANNELS

CROSS REFERENCE TO RELATED APPLICATIONS

This application claims priority to U.S. Provisional Patent Application Ser. No. 61/150,691 filed Feb. 6, 2009, which is hereby incorporated herein by reference in its entirety.

TECHNICAL FIELD

The present invention relates to communication networks, and more particularly, some embodiments relate to multicast communications over a communication network.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. Examples of communication networks that are gaining widespread popularity include exemplary implementations of wireless networks such as the Bluetooth®, Wireless USB, and various IEEE standards-based networks such as 802.11 and 802.16 communications networks, to name a few.

Many applications in wireless networks require multicast, or one-to-many communication. Examples include applications for military uses, audio and video conferences, sensor networks and the like. Indeed, audio/video multicasting is commonplace in today's technology driven home and office environments. In multicast communication, a single sender sends packets to multiple nodes in the network. Other applications have used multi-radio diversity, or path diversity, to improve loss resilience in wireless local area networks. However, in one-to-many-to-one applications, the multicast approach can be considered to waste bandwidth as multiple instances of the same packets are transmitted to multiple receivers. Additionally, this can be compounded by packet retransmission requirements of the network.

Examples of multicast systems have used frame combining and request-for-acknowledgement techniques to reduce the amount of retransmission and improve system performance. In frame combining, multiple copies of a given frame are combined to attempt to recover the entire frame. If the frame can be recovered, retransmission of that frame can be avoided. With request-for-acknowledgement techniques, if the sending device receives no acknowledgment for a given frame, the sending device sends a request for acknowledgement in an attempt to obtain status of the transmission. In such systems, the receivers are silent, and it is an aggregator at the back end of the receivers that sends the acknowledgement.

BRIEF SUMMARY OF EMBODIMENTS OF THE INVENTION

According to various embodiments of the invention, various algorithms are used to alleviate or reduce inefficient use of the air resources that may arise when packets are transmitted to multiple receivers. Additionally, various algorithms can be used to reduce or eliminate duplicates from being sent over a bus between the receivers and the intended recipient device or devices. This may eliminate or reduce the burden on the receiving device to process and discard duplicates and to help reduce transmission burden and bandwidth consumption. Additionally, in various embodiments, algorithms can be combined to achieve increased gains channel efficiency in some cases. For example, in some embodiments, packet retransmission is reduced as are the number of duplicate packets forwards by the receivers to the destination node or next recipient. Accordingly, this can eliminate or reduce duplicates being transmitted over the bus and reduce the burden on the monitor system to process and discard duplicates. In some embodiments, the algorithms focus on systems where all receivers are communicatively connected to the same destination device via a network.

In one embodiment, a method of transmitting packet data across a network includes: a transmitting network device establishing a reservation to transmit traffic to a plurality of wireless receiving network devices across a network; the transmitting network device transmitting a sequence of packets across the network, wherein a packet of the sequence of packets includes data requesting the receivers acknowledge receipt of the packet; the transmitting network device waiting for a predetermined time to receive acknowledgement of receipt of the packet from the wireless receiving network devices; the transmitting network device retransmitting a packet across the network only if it does not receive an acknowledgement for that packet from any of the wireless receiving network devices within the predetermined time.

In some embodiments, the transmitting network device transmits information identifying wireless receiving network devices and specifying an order in which wireless receiving network devices are to transmit their respective acknowledgements. The wireless receiving network device calculates a time to send its acknowledgements based on its position in the order in which wireless receiving network devices are to transmit their respective acknowledgements. In various embodiments, a wireless receiving network device calculating a time to send its acknowledgements includes: the wireless receiving network device determining its place in the identified order; the access controller calculating an amount of time required for any wireless receiving network devices that are earlier in the order to transmit their respective acknowledgements; and the wireless receiving network device determining the timeslot as a timeslot occurring a predetermined time after the amount of time calculated.

The transmitting network device can be further configured to determine a quantity of wireless receiving network devices to receive its traffic during the established reservation. The predetermined time can be calculated based on the quantity of wireless receiving network devices to receive the traffic. Additionally, the wireless transmitting device can be further configured to transmit an identification of wireless receiving network devices that are to receive and acknowledge the traffic.

In various embodiments, the order in which wireless receiving network devices are to transmit their respective acknowledgements is configured in advance of transmitting the traffic. Also, the plurality of wireless receiving network devices can be further configured to determine whether another of the plurality of wireless receiving network devices has forwarded the packet to the packet aggregator over the wired backbone. In a further embodiment, the wireless receiving network device forwards the packet to the packet aggregator only if the packet has not been forwarded to the aggregator by another of the plurality of wireless receiving network devices. The order in which wireless receiving network devices transmit their respective acknowledgements can be dynamically controlled by the packet aggregator In some applications, a wireless receiving network device of the plurality of wireless receiving network devices forwards the packet to a packet aggregator over a wired backbone network. Additionally, the packet aggregator can be configured to perform the operation of checking for duplicate packets and removing duplicate packets from packets received from the plurality of wireless receiving network devices to recreate the original sequence of packets. Also, the packet aggregator can be configured to perform the operations of forwarding the recreated original sequence of packets to a destination device and reordering received packets to maintain the order of packets transmitted by the transmitting network device.

In some embodiments, the systems and methods further include a wireless receiving network device of the plurality of wireless receiving network devices checking for an acknowledge signal from another receiver acknowledging the packet and transmitting its acknowledgement only if it has not received an acknowledgement signal from another wireless receiving network device of the plurality of wireless receiving network devices. The plurality of wireless receiving network devices can be further configured to transmit their respective acknowledgement signals to the other of the plurality of wireless receiving network devices via a wired or wireless interface or bus. The packet retransmitted can be a single packet or a group of packets covered by the data requesting acknowledgement.

In one application, the transmitting network device is a transmitter at an endoscope that wirelessly transmits streaming packet video data to the plurality of wireless receiving network devices disposed at different locations in an operating theater, and wherein the destination device is a video display monitor. Also, the wireless receiving network devices can include directional antennas with their respective radiation patterns directed toward a predetermined location in the operating theater.

In still a further embodiment, a method of operating a wireless endoscope having a wireless transmitter configured to wirelessly transmit streaming packet video data for display on a video display monitor, includes: the wireless transmitter at the endoscope establishing a reservation to transmit traffic to a plurality of wireless receiving network devices across a wireless network; the wireless transmitter transmitting a sequence of packets across the network, wherein a packet of the sequence of packets includes data requesting the receivers acknowledge receipt of the packet; the wireless transmitter waiting for a predetermined time to receive acknowledgement of receipt of the packet from the wireless receiving network devices; the wireless transmitter retransmitting a packet across the network only if it does not receive an acknowledgement for that packet from any of the wireless receiving network devices within the predetermined time.

In yet other embodiments, a transmitting network device, including a transmitter, a processor coupled to the transmitter and configured to execute instructions and a memory communicatively coupled to the processor and configured to store instructions, the instructions, when executed by the processor causing the transmitting network to perform the operations of: the transmitting network device establishing a reservation to transmit traffic to a plurality of wireless receiving network devices across a network; the transmitting network device transmitting a sequence of packets across the network, wherein a packet of the sequence of packets includes data requesting the receivers acknowledge receipt of the packet; the transmitting network device waiting for a predetermined time to receive acknowledgement of receipt of the packet from the wireless receiving network devices; the transmitting network device retransmitting a packet across the network only if it does not receive an acknowledgement for that packet from any of the wireless receiving network devices within the predetermined time.

In even other embodiments, a system for data communications from a transmitting network device to a receiving network device, includes: a plurality of wireless receiving network devices each comprising a receiver, a first processor coupled to the receiver and configured to execute instructions, and a first memory communicatively coupled to the processor and configured to store first program instructions, which when executed by the processor cause the receiving network devices to perform the operation of receiving a packet transmitted from the transmitting network device; the transmitting network device comprising a second processor coupled to the transmitter and configured to execute instructions, and a second memory communicatively coupled to the processor and configured to store second program instructions, which, when executed by the processor cause the transmitting network device to perform the operations comprising: establishing a reservation to transmit traffic to a plurality of wireless receiving network devices across a network; transmitting a sequence of packets across the network, wherein a packet of the sequence of packets includes data requesting the receivers acknowledge receipt of the packet; waiting for a predetermined time to receive acknowledgement of receipt of the packet from the plurality of wireless receiving network devices; retransmitting a packet across the network only if it does not receive an acknowledgement for that packet from any of the wireless receiving network devices within the predetermined time. The second program instructions can be further configured to cause the transmitting network device to transmit information identifying wireless receiving network devices and specifying an order in which wireless receiving network devices are to transmit their respective acknowledgements. The first program instructions can be further configured to cause the wireless receiving network device to calculate a time to send its acknowledgements based on its position in the order in which wireless receiving network devices are to transmit their respective acknowledgements. In some embodiments, a wireless receiving network device calculating a time to send its acknowledgements includes: the wireless receiving network device determining its place in the identified order; the access controller calculating an amount of time required for any wireless receiving network devices that are earlier in the order to transmit their respective acknowledgements; and the wireless receiving network device determining the timeslot as a timeslot occurring a predetermined time after the amount of time calculated.

In further embodiments, the second program instructions can be further configured to cause the transmitting network device to determine a quantity of wireless receiving network devices to receive its traffic during the established reservation. The predetermined time can be calculated based on the quantity of wireless receiving network devices to receive the traffic. Also, the second program instructions can be further configured to cause the transmitting network device to transmit an identification of wireless receiving network devices that are to receive and acknowledge the traffic.

The system can further include an aggregator having a processor coupled to a receiver and configured to execute instructions, and a memory communicatively coupled to the processor and configured to store third program instructions, which when executed by the processor cause the aggregator to perform the operation comprising receiving packets from the plurality of wireless network receiving devices and wherein the second program instructions are further configured to cause a wireless receiving network device of the plurality of wireless receiving network devices to forward the packet to a packet aggregator over a wired backbone network. In one embodiment, the third program instructions can be further configured to cause the packet aggregator to check for duplicate packets and remove duplicate packets from packets received from the plurality of wireless receiving network devices to recreate the original sequence of packets. Further, the third program instructions can be further configured to cause the packet aggregator to forward the recreated original sequence of packets to a destination device. Also, the third program instructions can be further configured to cause the packet aggregator to reorder received packets to maintain the order of packets transmitted by the transmitting network device.

In some embodiments, the second program instructions can be further configured to cause the wireless receiving network devices to determine whether another of the plurality of wireless receiving network devices has forwarded the packet to the packet aggregator over the wired backbone. The second program instructions can be further configured to cause the wireless receiving network devices to forward the packet to the packet aggregator only if the packet has not been forwarded to the aggregator by another of the plurality of wireless receiving network devices. Also, the order in which wireless receiving network devices transmit their respective acknowledgements can be dynamically controlled by the packet aggregator.

In some embodiments, the second program instructions are further configured to cause the wireless receiving network device to perforin the operation of checking for an acknowledge signal from another receiver acknowledging the packet and transmitting its acknowledgement only if it has not received an acknowledgement signal from another wireless receiving network device of the plurality of wireless receiving network devices.

In various embodiments, the wireless receiving network devices further comprise a bus interface and the second program instructions are further configured to cause the wireless receiving network device to transmit their respective acknowledgement signals to the other of the plurality of wireless receiving network devices via a wired or wireless interface or bus.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention relates to communication networks, and more particularly, some embodiments relate to video streaming over a communication network. According to various embodiments of the invention, various algorithms may be used to alleviate the inefficient use of the air resources that may be caused by unnecessary packet retransmission. In one embodiment, algorithms can be implemented to reduce or eliminate duplicate transmission of packets across a first network, such as a wireless network, where packets are sent to multiple receivers. Additionally, various algorithms can be used to reduce or eliminate duplicates from being sent by the multiple receivers to a destination node over a second network such as a bus or Ethernet network. This may eliminate the burden on the receiver to process and discard duplicates and to help reduce the transmission burden. Additionally, in various embodiments, multiple algorithms can be combined, which may result in increased channel efficiency in some cases. For example, in some embodiments, only one receiver forwards a successfully received packet to the recipient, thus eliminating or reducing duplicates from being transmitted over the bus and reducing the burden on the monitor system to process and discard duplicates.

Various systems and methods described herein may be used in conjunction with multiple receiver systems to reduce or eliminate packet duplication. With a multiple receiver system, error rate can be reduced due to the redundancy provided by multiple communication paths. A reduced error rate combined with techniques for removing or reducing redundancies can yield enhanced throughput over a multicast system. These techniques are different from a conventional multicast systems in which a source retransmits every packet that was lost by any receiver.

Figure 1:
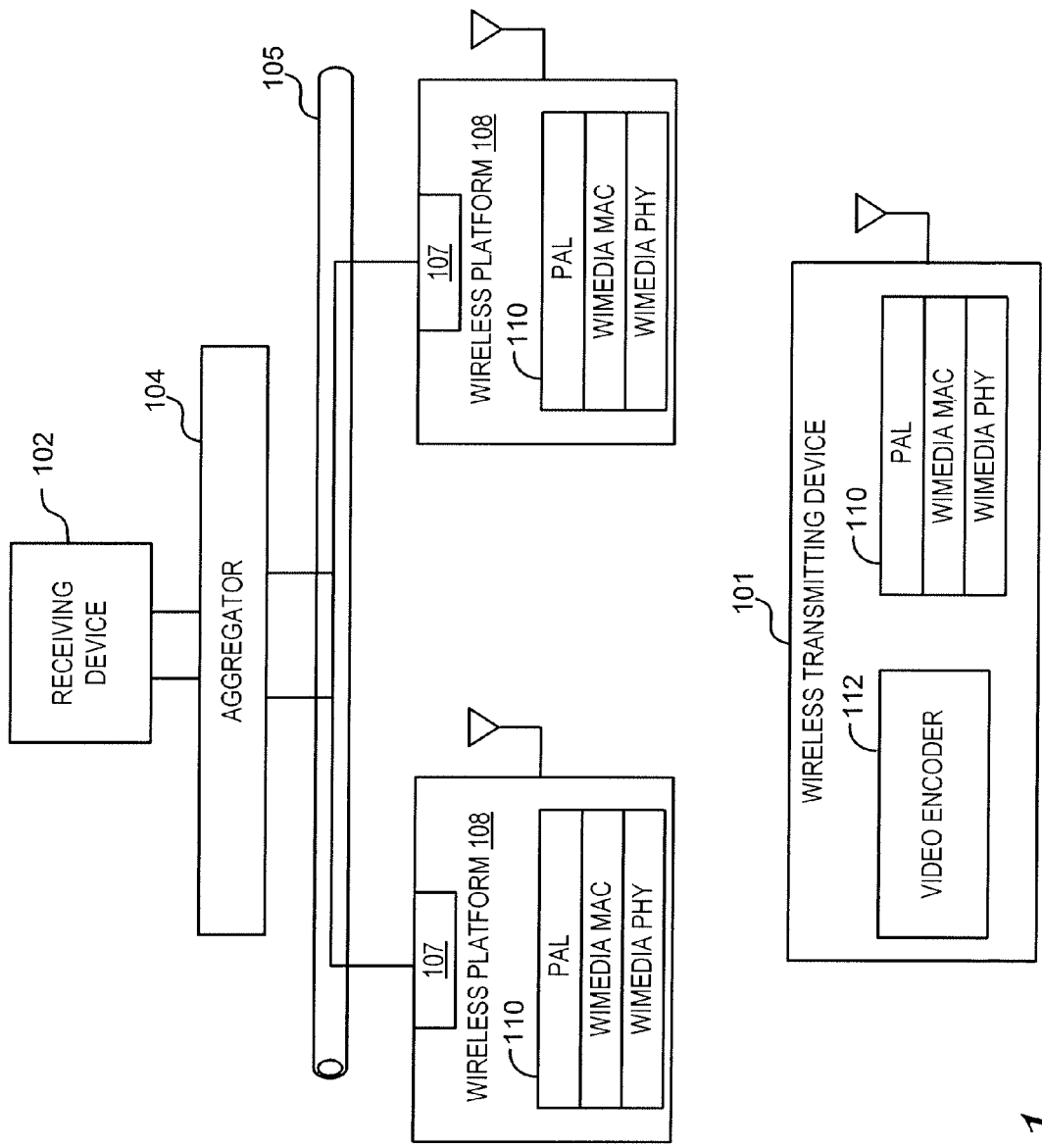
FIG. 1 is a diagram illustrating an example system for multicast transmitting packets over a wireless communication network and aggregating packets on a back end in accordance with one embodiment of the systems and methods described herein.

Before describing the invention in detail, it is useful to describe an example application and an example communication environment with which the invention and its various embodiments can be used. FIG. 1 is a diagram illustrating an example system for packet over a wireless communication network. As a further example, a system such as that shown in FIG. 1 can include an endoscopic camera such as, for example, a camera used for endoscopic surgery, communicating streaming video packets to a video monitor for display. Referring now to FIG. 1, in the illustrated example, a first wireless device 101 (such as a wireless endoscope in the above example) is configured to communicate with a destination device 102 (such as a video monitor in the above example) via a wireless communication channel such as a wireless communication network and a back end network 105. Accordingly, the wireless video device 101 is configured to include a wireless transmitter (or transceiver for two-way communications) such that it can wirelessly send streaming video to a wireless receiver (or transceiver for two-way communications) 108 across the wireless network. In this example, back and network 105 is an Ethernet network, and the wireless receivers 108 use an Ethernet transceiver 107 to communicate the content to the destination device 102 via a second network, or back-end network, such as an Ethernet link 105, although other communications interfaces can be used. An aggregator 104 can be included to aggregate traffic to the destination device 102, remove and reorder packets, and so on.

The wireless receiver in this example includes WiMedia layers in which a WiMedia Medium Access Control (MAC) layer is serviced by a multi-band OFDM physical layer (PHY), although other wireless communication protocols or configurations can be used.

The example in FIG. 1 includes two wireless receivers 108 as the receivers in this multi-cast system. One way to increase the reliability of communicating packets wirelessly is to use multiple receivers 108 positioned at different physical locations and connected to communicate information from the source to the recipient device through a fast-wired connection or a bus. With such a configuration, the recipient device (in this example, destination device 102) will receive a packet if any of the connected receivers successfully received that packet, absent other difficulties. As a further example, consider the application of a multicast system to be used with an in scope. Assuming this example that the endoscope is used at an operating table in a given position in the operating room. Accordingly, multiple receivers 108 can be positioned at various locations about the operating room to receive signals from the wireless transmitter at the endoscope. In some embodiments, positioning of one or more of the receivers can be fixed, while in other embodiments, one or more receivers can be configured to be moved were relocated about the area of interest.

In some embodiments, the transmitting wireless device 101 and the receivers 108 can be equipped with directional antennas in addition to or in place of a omni-directional antennas. Directional antennas can be used, for example, where the relative position of the transmitting and receiving devices is known and the signal pattern characteristics of the directional antenna can be effectively utilized.

Because of their different locations, the receivers 108 typically experience different channel attenuations and conditions; one receiver might experience a bad channel while the other might experience a good channel. Using multiple receivers at different locations, therefore, statistically increases the likelihood that a packet sent over the network from devices 101 reaches the network 105. Accordingly, this increases the likelihood that the packet reaches its ultimate destination at monitor 102.

Figure 2:
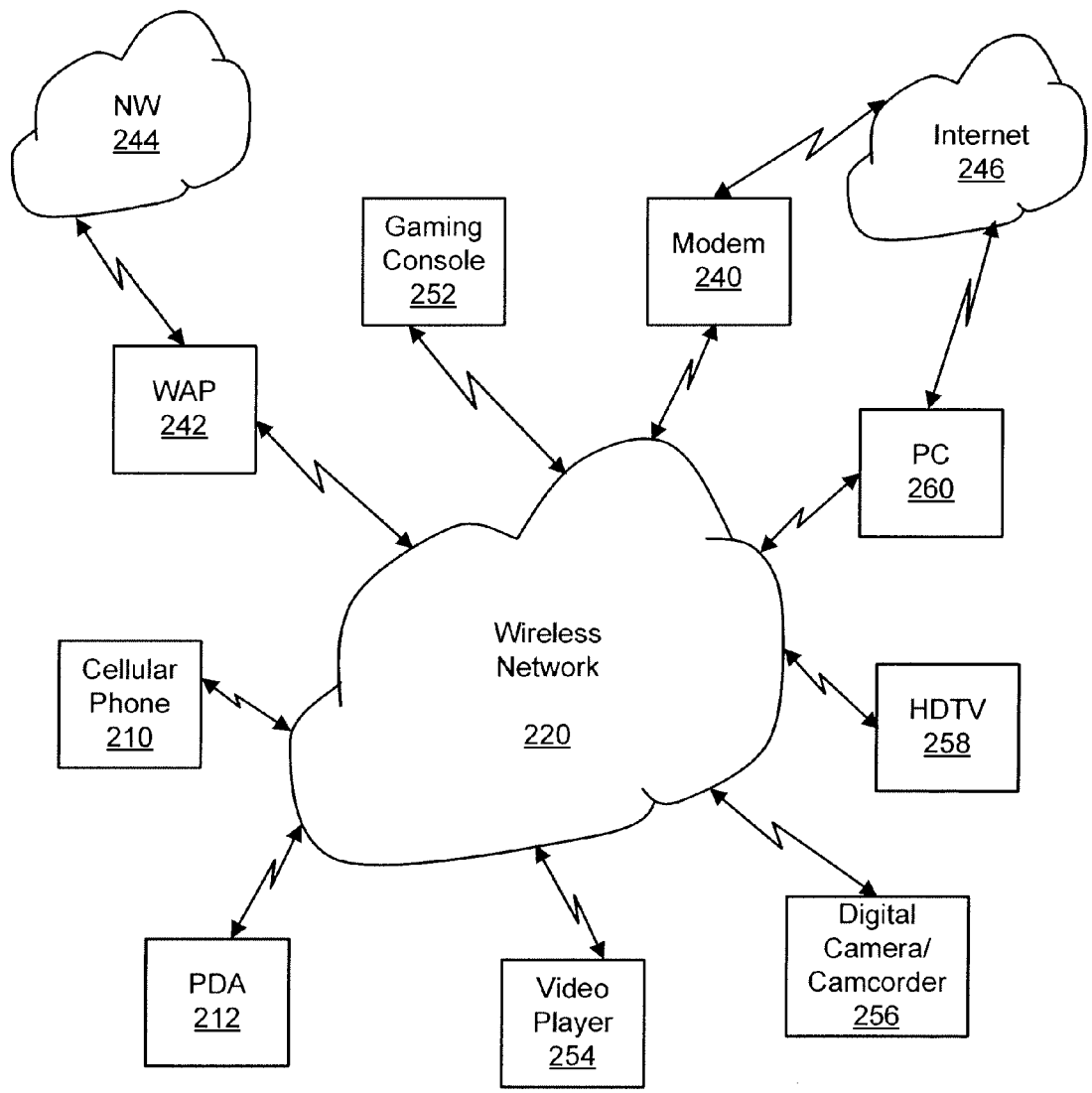
FIG. 2 is a block diagram illustrating one possible configuration of a wireless network that can serve as an example wireless network environment with which the systems and methods described herein can be implemented.

FIG. 2 is a block diagram illustrating one possible configuration of a wireless network that can serve as an example wireless network environment with which the systems and methods described herein can be implemented. Referring now to FIG. 2, a wireless network 220 is provided to allow a plurality of electronic devices to communicate with one another without the need for wires or cables between the devices. A wireless network 220 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations.

With many applications, the wireless network 220 operates in a relatively confined area, such as, for example, a home or an office. The example illustrated in FIG. 2 is an example of an implementation such as that which may be found in a home or small office environment. Of course, wireless communication networks and communication networks in general are found in many environments outside the home and office as well. In the example illustrated in FIG. 2, wireless network 220 includes a communication device to allow it to communicate with external networks. More particularly, in the illustrated example, wireless network 220 includes a modem 240 to provide connectivity to an external network such as the Internet 246, and a wireless access point 242 that can provide external connectivity to another network 244.

Also illustrated in the example wireless network 220 are portable electronic devices such as a cellular telephone 210 and a personal digital assistant (PDA) 212. Similar to the other electronic devices illustrated in FIG. 2, cellular telephone 210 and PDA 212 can communicate with wireless network 220 via the appropriate wireless interface. Additionally, these devices may be configured to communicate with an external network. For example, cellular telephone 210 is typically configured to communicate with a wide area wireless network by way of a base station.

Additionally, the example environment illustrated in FIG. 2 also includes examples of home entertainment devices connected to wireless network 220. In the illustrated example, electronic devices such as a gaming console 252, a video player 254, a digital camera/camcorder 256, and a high-definition television 258 are illustrated as being interconnected via wireless network 220. For example, a digital camera or camcorder 256 can be utilized by a user to capture one or more still picture or motion video images. The captured images can be stored in a local memory or storage device associated with digital camera or camcorder 256 and ultimately communicated to another electronic device via wireless network 220. For example, the user may wish to provide a digital video stream to a high definition television set 258 associated with wireless network 220. As another example, the user may wish to upload one or more images from digital camera 256 to his or her personal computer 260 or to the Internet 246. This can be accomplished by wireless network 220. Of course, wireless network 220 can be utilized to provide data, content, and other information sharing on a peer-to-peer or other basis, as the provided examples serve to illustrate.

Also illustrated is a personal computer 260 or other computing device connected to wireless network 220 via a wireless air interface. As depicted in the illustrated example, personal computer 260 can also provide connectivity to an external network such as the Internet 246.

In the illustrated example, wireless network 220 can be implemented to provide wireless connectivity to the various electronic devices associated therewith. Wireless network 220 allows these devices to share data, content, and other information with one another across wireless network 220. Typically, in such an environment, the electronic devices would have the appropriate transmitter, receiver, or transceiver to allow communication via the air interface with other devices associated with wireless network 220. These electronic devices may conform to one or more appropriate wireless standards and, in fact, multiple standards may be in play within a given neighborhood. Electronic devices associated with the network typically also have control logic configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Electronic devices operating as a part of wireless network 220 are sometimes referred to herein as network devices, members or member devices of the network or devices associated with the network. In one embodiment, devices that communicate with a given network may be members or they may merely be in communication with the network.

Having thus described an example environment in which the invention can be implemented, various features and embodiments of the invention are now described in further detail. Description may be provided in terms of this example environment for ease of discussion and understanding only. Also, various embodiments are described herein in terms of a source device such as an endoscope streaming packets of data to a recipient device such as a monitor over a wireless network having multiple receivers. After reading the description herein, it will become apparent to one of ordinary skill in the art that the present invention can be implemented in any of a number of different communication environments (including wired or wireless communication environments, and distributed or non-distributed networks) operating with any of a number of different electronic devices.

Embodiments of the systems and methods described herein are directed toward techniques for increasing the efficiency of wired and wireless channels of a communication network by reducing or eliminating multiple transmissions of data packets. For example, in one embodiment, the transmitter sends the data packets to a plurality of receivers. The receivers each acknowledge receipt of the packets they receive. For a given packet or group of packets, if the transmitter does not receive an acknowledgment from any of the receivers, the transmitter retransmits that packet or group of packets. If, on the other hand, the transmitter receives an acknowledgement from at least one receiver, then that packet or group of packets does not need to be resent. This can present a bandwidth savings over conventional multicast systems in which packets are resent if any number fewer than all the receivers acknowledge receipt. Additionally, because the system can be implemented in a one-to-many-to-one implementation (as shown in the example of FIG. 1), packet error rates can improve because, at least as far as the wireless network is concerned, the packets are statistically more likely to reach the destination. With reduced error rates and techniques as described herein to avoid or reduce unnecessary duplication, system throughputs can be improved over that of unicast or one-to-one-to-one systems.

Figure 3:
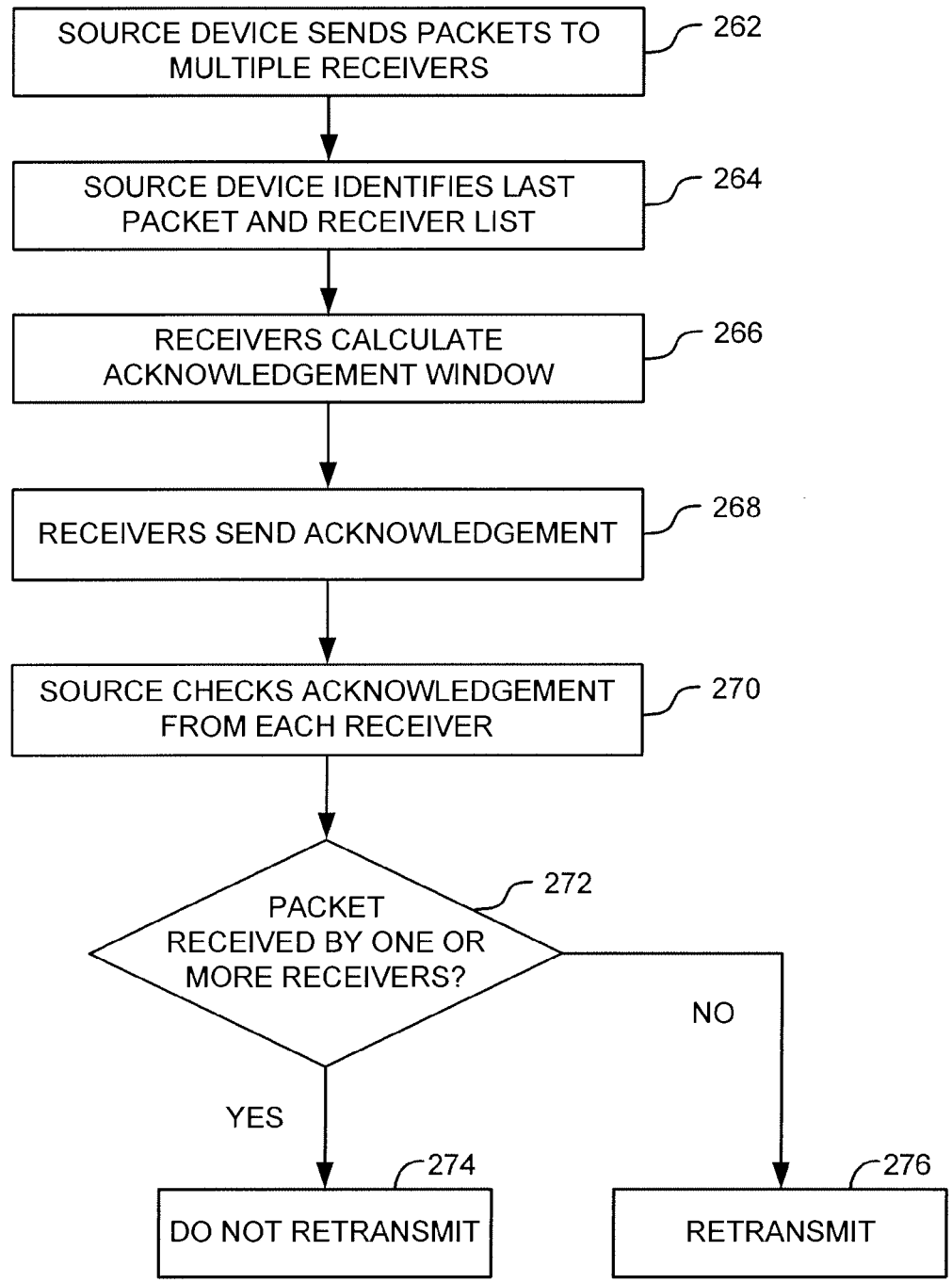
FIG. 3 is a diagram illustrating an example process for frame retransmission in a multiple receiver system in accordance with one embodiment of the systems and methods described herein.

FIG. 3 is a diagram illustrating an example process for frame retransmission in a multiple receiver system in accordance with one embodiment of the systems and methods described herein. Referring now to FIG. 3, at operation 262, source device sends a stream of packets to a plurality of receivers in a wireless network. For example, in accordance with the example system described above with respect to FIG. 1, a wireless video device, such sends a plurality of video packets across the wireless network to a plurality of wireless platforms 108, which receive and forward the packets to the destination device 102. In terms of the endoscopic camera example used above, a wireless transmitter associated with the endoscopic camera sends streaming video packets across the wireless network to multiple receivers 108.

In one embodiment, the source device 101 identifies a last packet in a group of packets being sent. Additionally, in another embodiment, the source device 101 identifies a plurality of receivers 108 to which the packets are sent. The identified receivers can be all of, or a subset of all or fewer than all of, the receiver nodes in the network. This is illustrated at operation 264. Although only two receivers 108 are shown in FIG. 1, additional receivers can be provided and used.

At operation 266, receivers 108 receiving the packets check for the identification of the last packet in the group. Upon receipt of the last packet, receivers 108 that received the packets calculate a time slot in which to send their acknowledgment packet to the source 101 acknowledging receipt of the packets. In one embodiment, sequence numbers, packet counts, or other information can be used to enable the receiver to determine whether or not it received all the packets in the group.

In one embodiment, the order in which receivers are to acknowledge receipt of the packets is sent by the transmitter to the receivers 108 that are to acknowledge the packets. In such an embodiment, the receivers can check their order on list and determine their acknowledge timeslots according to their respective number. Each receiver can then transmit its acknowledgment in accordance with its spot in the order. In another embodiment, receiver acknowledgment timeslots can be predetermined and the receivers configured to send their acknowledgment packet in their predetermined time slot. In yet another embodiment, acknowledgment timeslots can be negotiated and reserved such as, for example, during a beaconing period. Embodiments for calculating the acknowledgment timeslots are described in further detail below with reference to FIG. 4.

At operation 270, the source 101 checks for acknowledgments from each of the identified receivers 108. If the group of packets was received by one or more of the receivers 108 as indicated by their respective acknowledgment packets, the source 101 does not need to retransmit the group of packets. This is illustrated by operations 272 and 274. If, on the other hand, the source determines that none of the designated receivers received the group of packets, the source retransmits a group of packets as illustrated by operations 272 and 276. For example, this can be determined by the source 101 if it does not receive any acknowledgements from the receivers before the end of a determined timeout period. In some embodiments, the source device 101 knows how many receivers 108 are intended recipients, and therefore can be aware of how many acknowledgment packets to expect. This can be done, fore example, as part of the beaconing operations were the source device 101 and the receivers 108 see each other's beacons and share reservation information.

Figure 4:
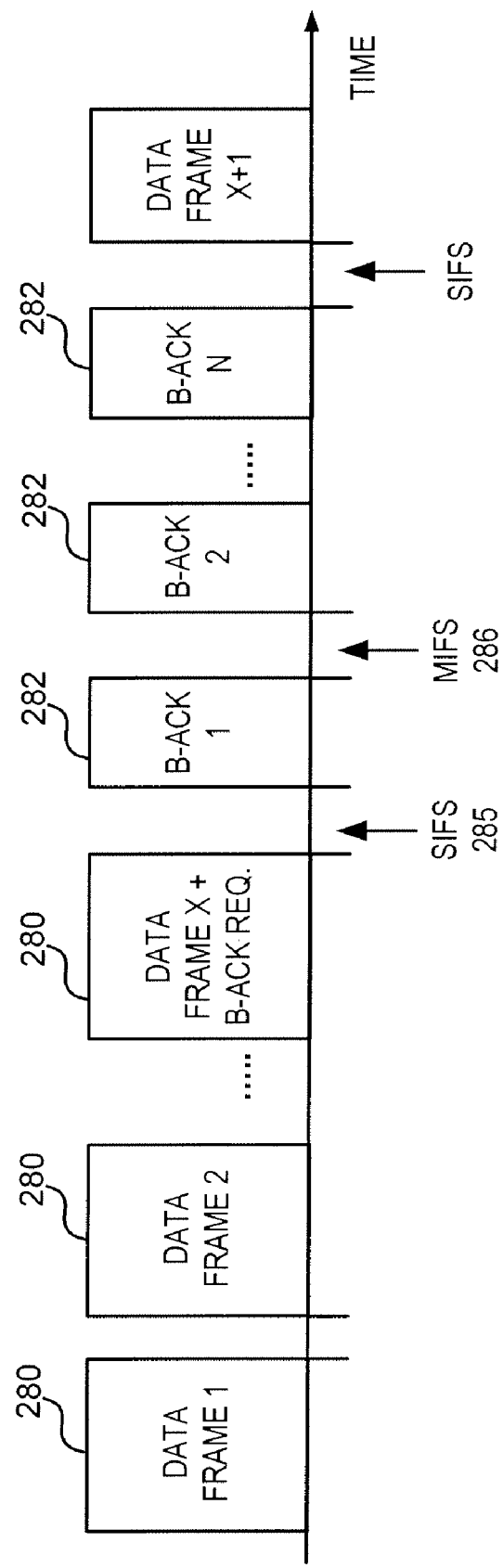
FIG. 4 illustrates an example use of receiver signal timing in a multiple-receiver system to determine frame retransmission requirements in accordance with one embodiment of the systems and methods described herein.

The example illustrated and described above with respect to FIG. 3 shows how a source device can use acknowledge packets from designated receivers to determine whether or not retransmission of a packet is required. FIG. 4 illustrates an example use of receiver signaling in a multiple-receiver system to determine frame retransmission requirements in accordance with one embodiment of the systems and methods described herein. The acknowledge frames in one embodiment are acknowledge frames otherwise used by receivers in conventional network communications. For example, in a WiMedia application, acknowledge signals such as the immediate acknowledge (Imm-ACK) signal and block acknowledge (B-ACK) signal specified in the WiMedia MAC Specification can be used in a multi-receiver environment to determine retransmission requirements.

In various embodiments, a data source transmits a packet once, then checks for acknowledgements from the receivers before retransmitting the packet. The source sends the packet once, and does not retransmit the packet unless it was not received by any of the receivers. Accordingly, embodiments can be implemented wherein only one instance of a received packet is forwarded from the receiver group to the intended recipient. Thus, for example, the network interface of an endoscope 101 can check the acknowledge packets of various receivers 108 in the network before retransmitting a packet or group of packets. Furthermore, a packet only needs to be transmitted once over the wired interface between the receiver and the monitor.

In the illustrated example, a B-ACK signal 282 is used because the Imm-ACK is a special case of the B-ACK. As illustrated in FIG. 4, the source device uses the WiMedia Distributed Reservation protocol to establish a reservation of type Private in order to send its traffic to the receivers. Similar to the B-ACK mechanism described in the WiMedia standard, the source can send a sequence of packets 280 where the last packet 280 has the ACK subfield set to B-ACK Req. Unlike the standard, however, in one embodiment the source also includes a list identifying receivers that must respond with an acknowledge signal if the packet is received. For example, in one embodiment, the source includes a list of device addresses (e.g., DevAddrs) of receivers that must respond with a B-ACK frame. This source list can be denoted as SourceList. The order in that list can dictate the order in which receivers send their B-ACK frames back to the source. Other designations can be used to designate the order of acknowledgements such as, for example, a separate field with the list. A device whose order is earlier in the list is sometimes referred to as an earlier device.

In one embodiment, a receiver that successfully receives a packet waits for its turn in the list to send its acknowledgement to give earlier devices, if any, the opportunity to send their acknowledgements first. For example in terms of the embodiment illustrated in FIG. 4, a receiver waits the duration of the short inter-frame spacing (SIFS) interval 285, and also waits an amount of time equal to the acknowledge control frame duration and the minimum inter-frame spacing (MIFS) 286 for each of the receivers ahead of it on the list. Accordingly, the first receiver on the list would wait the duration of the SIF interval 285, then send its acknowledgement packet 282. The second receiver on the list would wait for the duration of the SIS interval 285 plus the duration of the acknowledgment packet 282 of the first receiver plus the minimum inter-frame spacing interval 286 between the first receiver's packet and its own acknowledgment packet 282. Likewise, the nth receiver would wait for the duration of the SIS interval 285 plus the aggregate duration of the acknowledgment packets 282 and minimum inter-frame spacing intervals 286 for the N−1 receivers preceding it.

An example of this is given by:

Receiver $N$ Wait Time=SIFS Duration+$(N-1)$*(B-ACK Duration+MIFS Duration)

In another example, the receiver waits the time

SIFS+Position_in_SourceList_in_B-ACK_*Req*×(Max_B-ACK_control_frame_duration+MIFS)

after the reception of the last packet in the B-ACK sequences, before transmitting its B-ACK frame. As noted above, in one embodiment the last packet is identified to the receiver. For example, in a WiMedia embodiment, source sets the last packet's ACK subfield to B-ACK Req.

In various embodiments, the source device waits until sufficient time has elapsed such that all designated receivers have had an opportunity to respond. Then, the source devices retransmits the sent packet only if it none of the receivers acknowledges receipt. For example, in some embodiments, the source device retransmits a packet only if all the received B-ACK frames do not acknowledge the reception of the packet.

In some applications, the transmission of groups of packets from a source to multiple receivers across a wireless network may also result in a duplication of packet transmissions across a wired network to which those wireless receivers are connected. For example, in terms of the example application described above with reference to FIG. 1, if packets of video or streamed to the multiple receivers 108, each of those receivers 108 may in turn forward those packets to destination device 102. Therefore, if both receivers each receive a given group of packets and forward those to the monitor, traffic across the Ethernet network 105 is doubled for those packets. Likewise, the bandwidth impact can be compounded as more receivers are added to the system.

Accordingly, in various embodiments, receiver acknowledge signals can also be used to reduce or eliminate duplicate packet transmissions between the wireless receivers and the destination device communicatively coupled to those receivers across a second network (e.g., the Ethernet 105 in the example of FIG. 1). For example, in terms of the example application described above with reference to FIG. 1, the systems and methods described herein can use receiver acknowledge signals to reduce or eliminate duplicate packet transmissions across the Ethernet interface 105 between the wireless network devices 108 and a display monitor 102.

Figure 5:
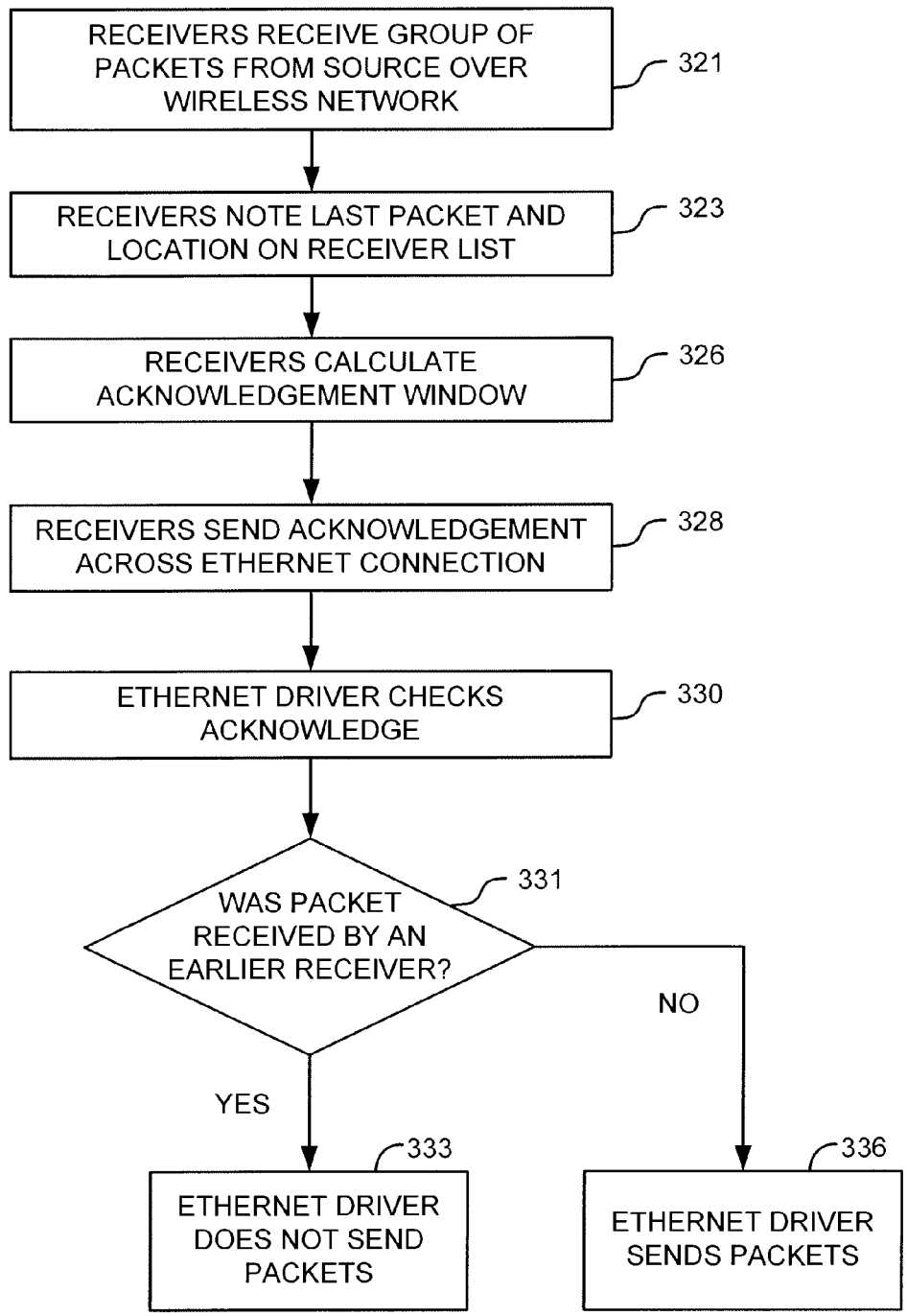
FIG. 5 is a diagram illustrating an example process for using acknowledgment information to manage packet retransmission in accordance with one embodiment of the systems and methods described herein.

FIG. 5 is a diagram illustrating an example process for using acknowledgment information to manage packet retransmission in accordance with one embodiment of the systems and methods described herein. Referring now to FIG. 5, at operation 321 receivers receive a group of packets from a source over a wireless network. For example, these can be receivers such as those receivers described above with reference to FIGS. 3 and 4. As described above with reference to FIG. 3, the receivers note the last packet in the group of packets transmitted and determine their respective location on the receiver list. This is illustrated by operation 323. As also described above with reference to FIG. 3, the receivers calculate their acknowledge timeslot at which to send their respective acknowledgment packet. This is illustrated by operation 326. However, in the example illustrated in FIG. 5, in addition to (or instead of) sending their acknowledgment packets to the wireless source, the receivers send their acknowledge of packets to the wired network across which the destination node is attached. For example, in terms of the sample application described above with reference to FIG. 1, the receivers 108 would send their acknowledgment packets to an Ethernet driver for Ethernet network 105.

At operation 330, the Ethernet driver, or other network node, checks the acknowledgment packets received from each of the receivers. Particularly, in the illustrated embodiment, the Ethernet driver checks the acknowledge packet of a given receiver 108 to determine if acknowledgment for the same packet or group of packets was previously received from another receiver 108. This is illustrated by operation 331. If acknowledgment for the same packet group of packets was already received by the Ethernet driver from another receiver 108, the Ethernet driver does not send a group of packets from this current receiver 108 as these would be duplicate to the packets sent from the previous receiver 108. This is illustrated by operation 333. If, on the other hand, and acknowledgment for this group of packets was not already received from another receiver 108, Ethernet driver for the group of packets across Ethernet to the destination device 102. This is illustrated by operation 336.

Figure 6:
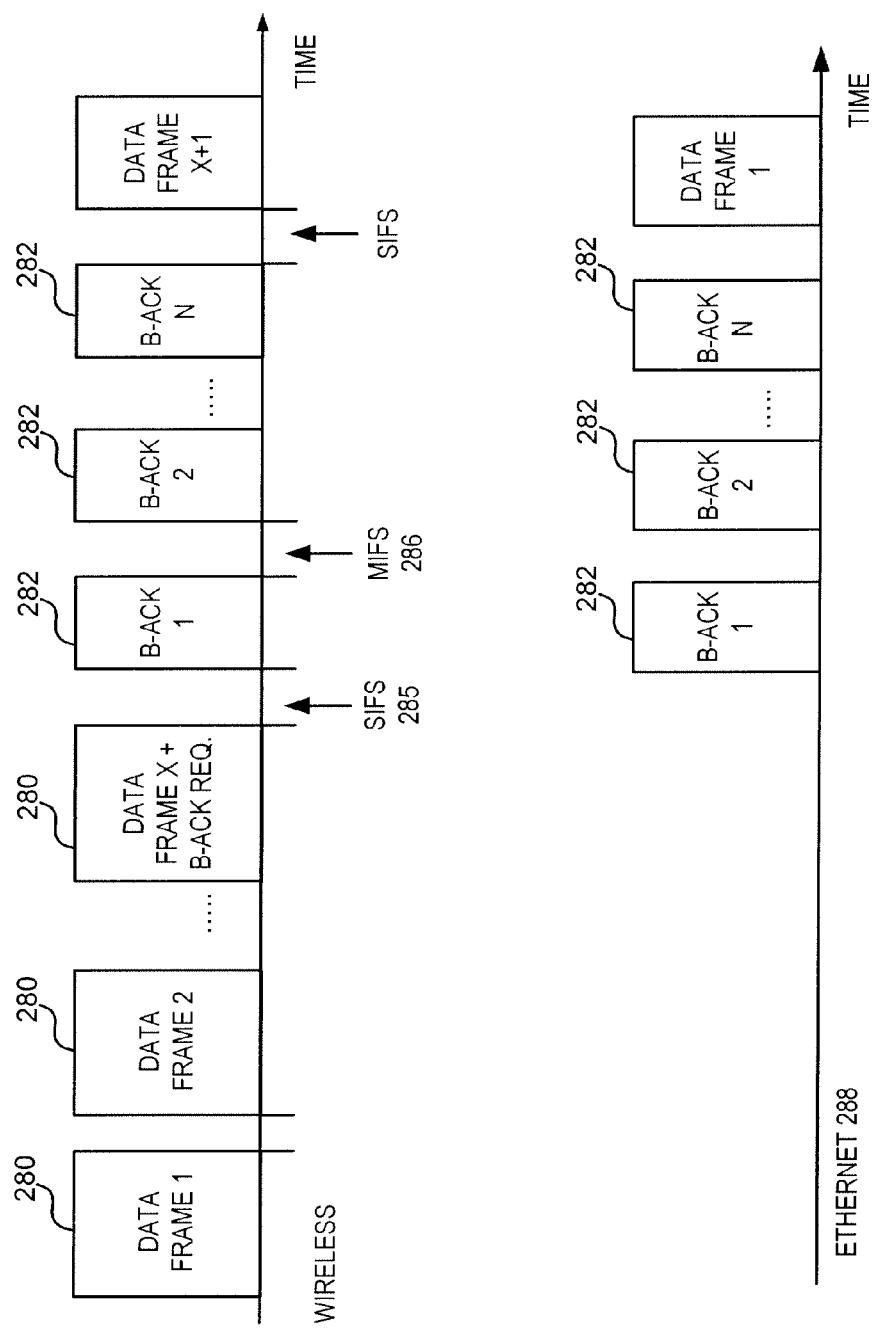
FIG. 6 is a diagram illustrating an example of signaling to reduce or eliminate duplication on a wireless network and a wired network.

FIG. 6 is a diagram illustrating an example of signal timing of the systems and methods described herein on both a wireless network and a wired network (for example, Ethernet). Referring now to FIG. 6, as noted above with reference to FIG. 5, various embodiments may be provided to reduce or eliminate duplicate transmissions across a hard wired or other backend network to which the wireless network receivers are connected. Again, as described above with reference to the example of FIG. 1, after successfully receiving a block of packets from the source 101, each of the receivers 108 can forward the received block of packets over a high-speed bus or network connection 105, such as an Ethernet connection, to the destination device 102.

In various embodiments, to reduce or eliminate duplicate packets sent across the back-end network, the receiver may send the same or similar acknowledge information 282 to the Ethernet bus 288, targeting only a subnet of the receivers. This can be done for each receiver as soon as it starts transmitting its acknowledgment (for example, B-ACK) over the air interface. The Ethernet driver, in one embodiment, forwards to the recipient device controller only those packets 280 that where not already acknowledged by another receiver. In one embodiment, the last receiver in the group is not required to transmit its acknowledge information over the Ethernet. Accordingly, in various embodiments, the device controller is responsible only for rearranging delivered packets; decisions about eliminating the duplication is handled via the Ethernet driver or distributed over all receivers making the system scalable.

In some instances, acknowledge packets 282 from receivers could be lost over the wireless interface. If this happens, the source device might not be aware that a group of packets was properly received and consequently retransmit the same information to the receivers. Accordingly, in one embodiment, to avoid generating duplicates for this case the WiMedia MAC can be configured to forward retransmission window information to the Ethernet driver where it will mach it to the early acknowledged packets.

In various embodiments, duplicates may be eliminated using a wire line. For example, in a case employing only ImmACK, an algorithm for eliminating duplicates can be configured to use a signaling line that is connected across, for example, all receivers. When a receiver sends an ImmACK it may check the status of this signaling line. If the signal line is in the "UNLOCK" state, the receiver can forward the packets to the device controller and drive the signaling line to the "LOCK" state. It can keep that line in the "LOCK" state until an acknowledge window time is expired. If the signaling line is in the "LOCK" state already the receiver may discard the packet. Accordingly, only one receiver is given permission to send the packets, and locking the signaling line prevents the other receivers from sending duplicate information. In one embodiment, the acknowledge window time is defined by the interval between the last packet and the first acknowledge packet plus the time allotted for the acknowledge windows for all receivers and the spacing therebetween. An example of this is calculated as:

SIFS+Number of receivers in the system×(Max_ImmACK_control_frame_duration+MIFS)

Figure 7:
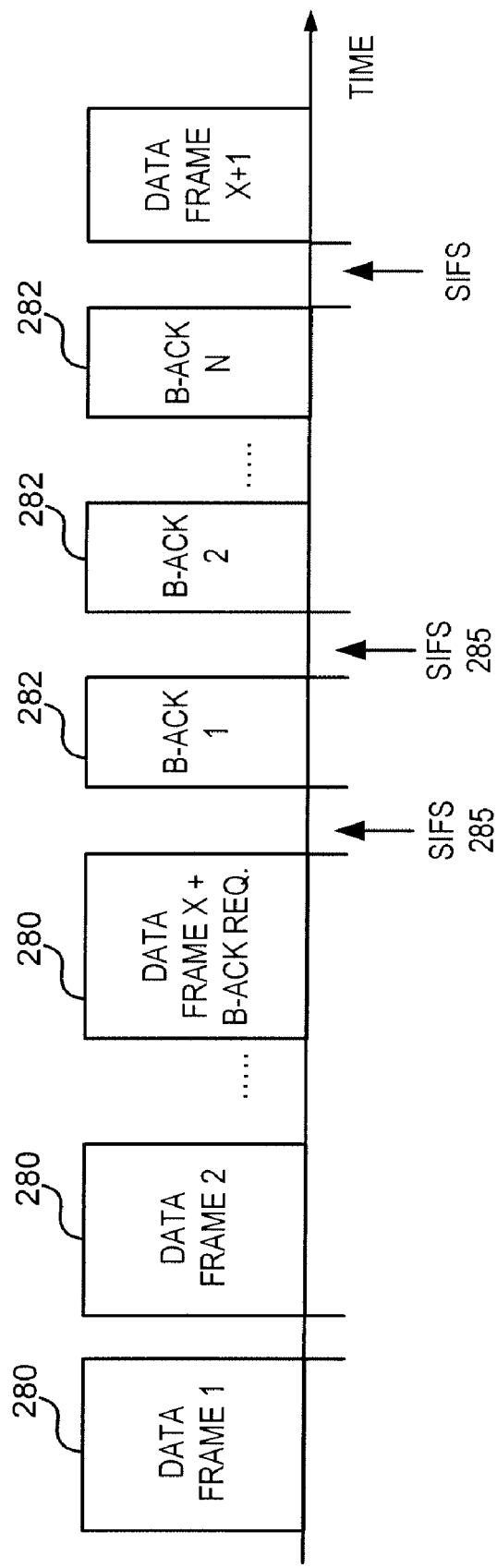
FIG. 7 is a diagram illustrating another example of signaling to reduce or eliminate duplication in accordance with one embodiment of the systems and methods described herein.

FIG. 7 is a diagram illustrating another example of signaling to reduce or eliminate duplication in accordance with one embodiment of the systems and methods described herein. Referring now to FIG. 7, duplicates may be reduced using a wireless interface among the plurality of receivers. For example, in one embodiment, system receivers 108 are configured to listen to the acknowledge frames of other receivers 108 before sending their own respective acknowledge frames. Earlier devices with respect to a subject device can be defined in one embodiment as those receivers whose acknowledgment order in the source is earlier than acknowledgment slot of the given device. By monitoring the wireless interface for acknowledge frames (for example, B-ACK frames) of other devices, a receiver can determine whether data packets were received by an earlier device, and if so, avoid sending duplicate packets to the Ethernet or other back-end network.

In some environments such as WiMedia, for example, for radios to be able to receive other a B-ACK from other radios and then transmit their own B-ACK, the duration between the B-ACK frames cannot be MIFS as illustrated in the example of FIG. 4. Instead, that duration is extended to SIFS as illustrated in FIG. 7. Note that this results in a slight reduction in channel efficiency where SIFS is larger than MIFS. It is possible, however, that some radios might not successfully receive all B-ACK transmitted by other radios. Accordingly, this method does not eliminate all duplicates, but only eliminates some of the duplicates. This can still reduce the bandwidth on the back end network (for example, the Ethernet) and the burden on the monitor system or device driver to process and discard duplicates.

Figure 8:
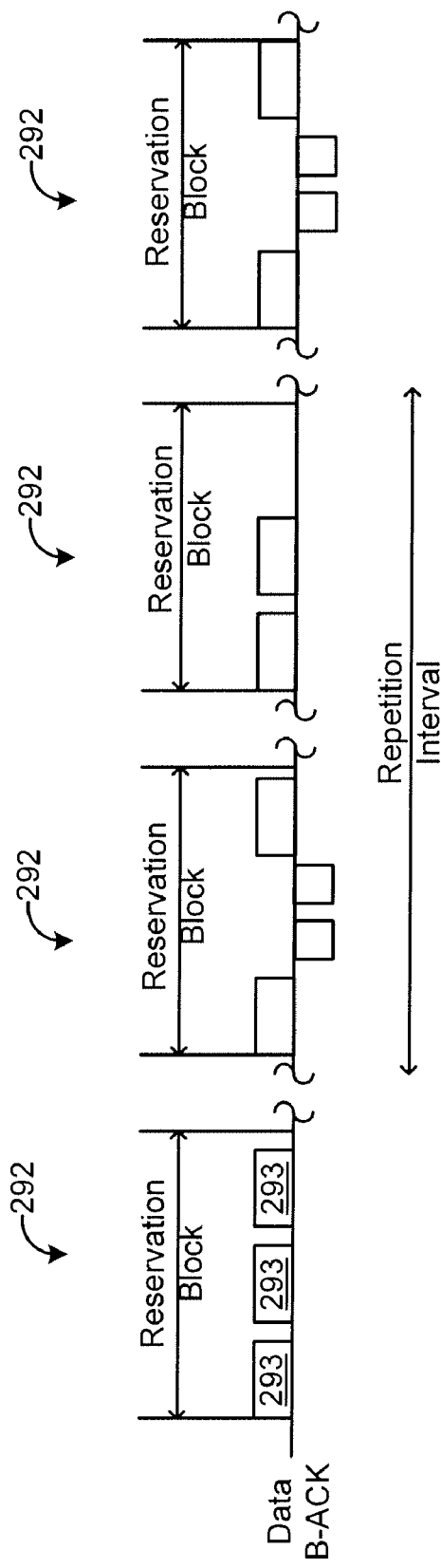
FIG. 8 is a diagram illustrating an example throughput model for a block acknowledge in accordance with one embodiment of the systems and methods described herein.

FIG. 8 is a diagram illustrating an example throughput model for a block acknowledge in accordance with one embodiment of the systems and methods described herein. Referring now to FIG. 8, this diagram shows an example of repetition with four repetitions 292 per B-ACK. The throughput in such a scenario is defined by the number of bits per MAC Protocol Data Unit (MPDU) 293 times the number of MPDUs 293 per each repetition 292, times the number of repetitions 292 per superframe times the number of superframes per second. Accordingly, throughput of the system in bits/second can be given by:

$$\text{Throughput} = \frac{\text{bits}}{MPDU} \times \frac{MPDUs}{\text{repetition}} \times \frac{\text{repetitions}}{SF} \times \frac{SFs}{\text{sec}}$$

Figure 9:
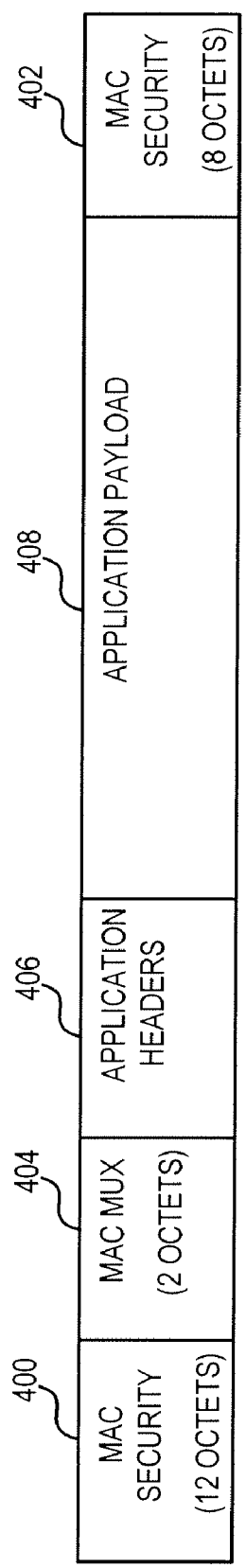
FIG. 9 is a diagram illustrating an example MAC frame that can be used in conjunction with embodiments of the systems and methods described herein.

FIG. 9 is a diagram illustrating an example MAC frame that can be used in conjunction with embodiments of the systems and methods described herein. MAC throughput, which in one embodiment is defined as bits of MAC frame payload per second, can be impacted by MAC frame overhead. Accordingly the effective application throughput may be lower than MAC throughput due to overhead from optional MAC features and application headers. In the illustrated example, the MAC frame payload includes a MAC security header 400 and footer 402 (e.g., 20 octets), a MAC MUX header (e.g., 2 octets or 5 octets) 404, and application headers of varying length (e.g., X octets) 406. In various embodiments, the Application Payload 408 is the part of the frame that may be used to transmit user data.

Accordingly, in the illustrated example, MAC frame overhead that impacts throughput includes 20 octets for the MAC security header and footer 400, 402, and 2 octets for the MAC MUX header. With this example, and assuming X octets application headers 406, the actual application throughput may be determined from MAC throughput by (N−22−X)/N.

Increasing the number of receivers and using selective retransmission as described herein can, in some applications, affect the Packet Error Rate (PER) of the system, which can affect throughput. Some embodiments can use a unicast block ACK having a long preamble. Assume for example that p denotes the data packet physical layer packet error rate, PHY PER; q denotes the acknowledge packet PHY PER (for example the B-ACK PHY PER); and N denotes the number of data packets per acknowledge packet. Throughput would then be scaled by $(1-p)(1-q/N)$.

For multiple receiver environments, a packet is lost only if it is lost by all receivers. Accordingly, with data packet physical layer packet error rate with M receivers of $p^M$, throughput may be reduced by $(1-p^M)(1-q/N)$. Compared to a unicast transmission, however, each repetition may take longer because of multiple acknowledges.

Various reservation scenarios can be implemented with the systems and methods described herein. A maximal reservation would include all available Medium Access Slots (MAS). Assume, for example, that the first four MAS in the superframe are set aside for beaconing (the WiMedia MAC control channel). A maximal reservation comprises all the remaining MAS. In other words, in one embodiment the system may use one reservation block of 252 MAS. Another form of maximal reservation limits the amount of MAS that can be reserved. For example, a 7 row reservation would be limited to 112 MAS and 16 reservation blocks of 7 MAS each.

Figure 10:
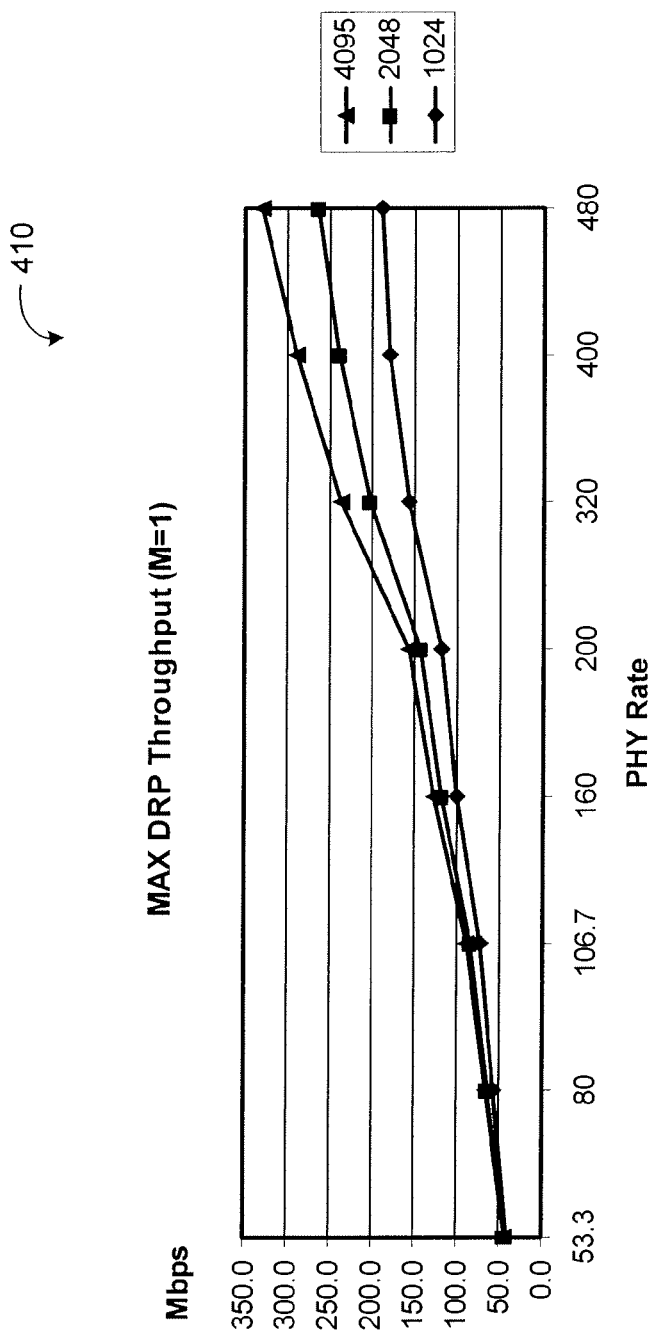
FIG. 10 illustrates an example of throughput results for unicast systems at bit rates of 4095, 2048, and 1024 at a PER of 8%.
Figure 11:
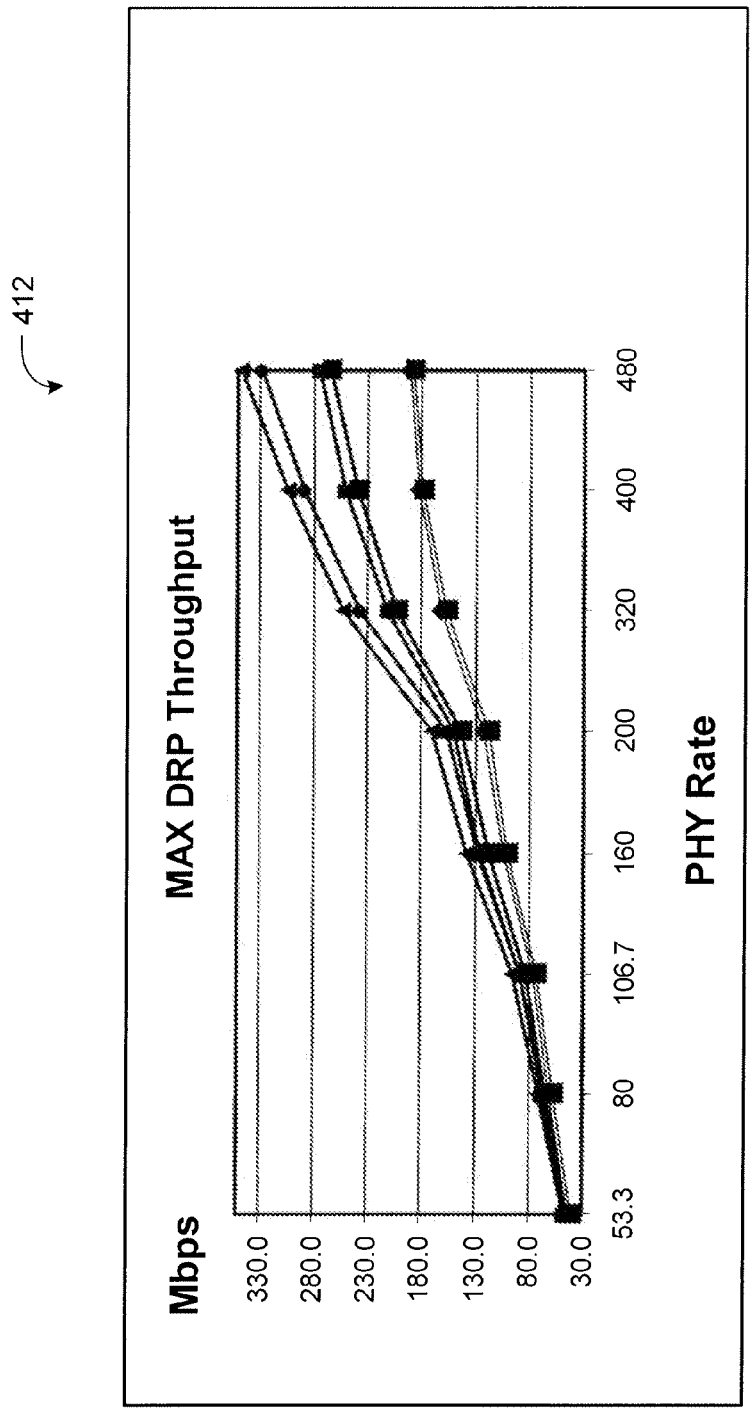
FIG. 11 illustrates an example of DRP throughput results showing a direct comparison between throughput received in a unicast system and the throughput obtained in a two-receiver, or two-cast, system.
Figure 12:
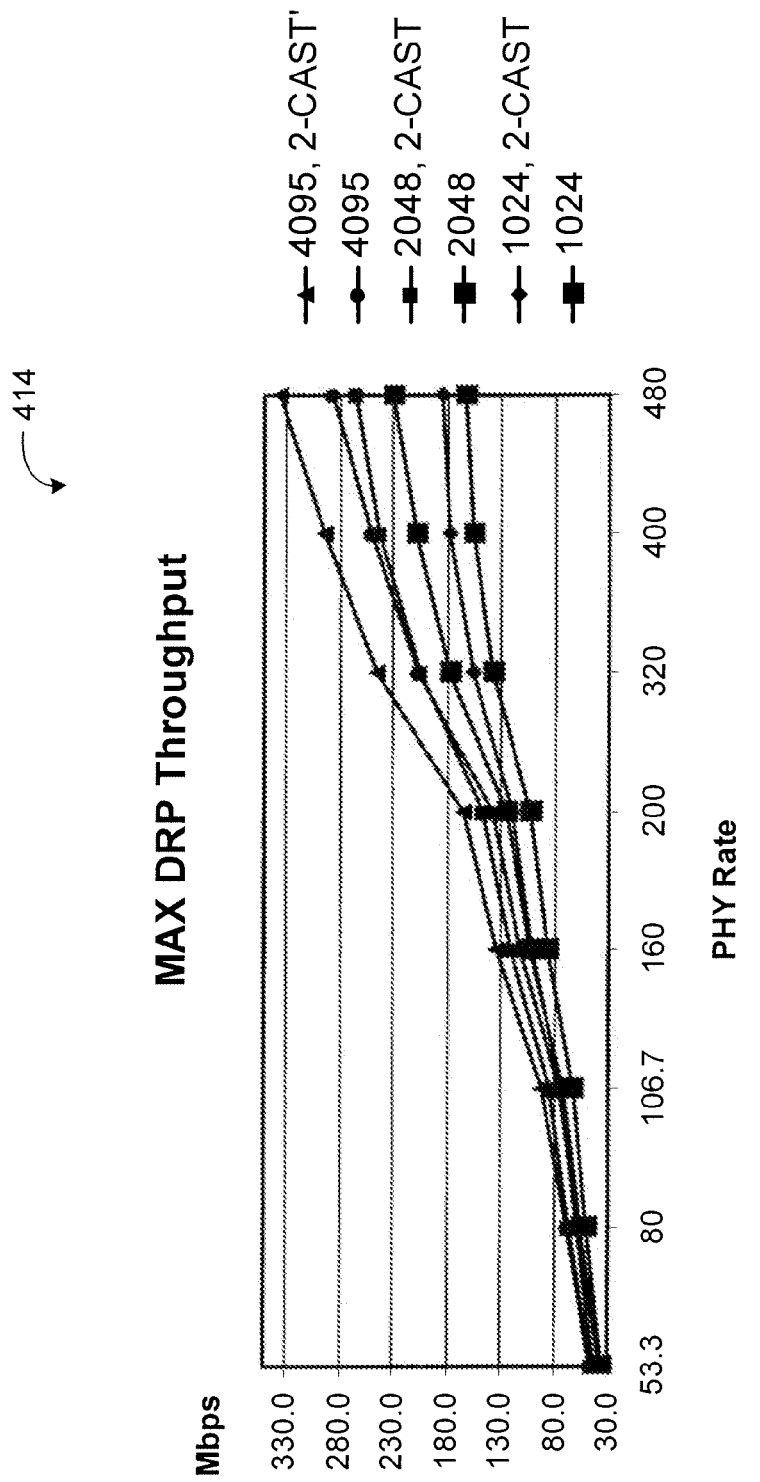
FIG. 12 illustrates an example of DRP throughput results at the same bit rates with a PER of 20%.

FIGS. 10, 11, 12, and 13 are diagrams illustrating various examples of maximum Distributed Reservation Protocol (DRP) throughput at various packet sizes, assuming a burst size of 8. FIG. 10 illustrates an example of throughput results 410 for unicast systems at bit rates of 4095, 2048, and 1024 at a PER of 8%. FIG. 11 illustrates an example of DRP throughput results 412 at the same bit rates, but shows a direct comparison between throughput received in a unicast system and the throughput obtained in a two-receiver, or two-cast system. As this example illustrates, for a PER of 8% the maximum throughput is generally higher for each of the data rates with a two-receiver system. The throughput gains achieved tend to be greater at higher PHY rates 413. FIG. 12 illustrates an example of DRP throughput results 414 at the same bit rates with a PER of 20%. As this example illustrates, at a higher PER rate, the throughput advantages achieved by the two-receiver system are more pronounced than at the lower PER rate. Also, the throughput gains achieved tend to be greater at higher PHY rates 413.

Figure 13:
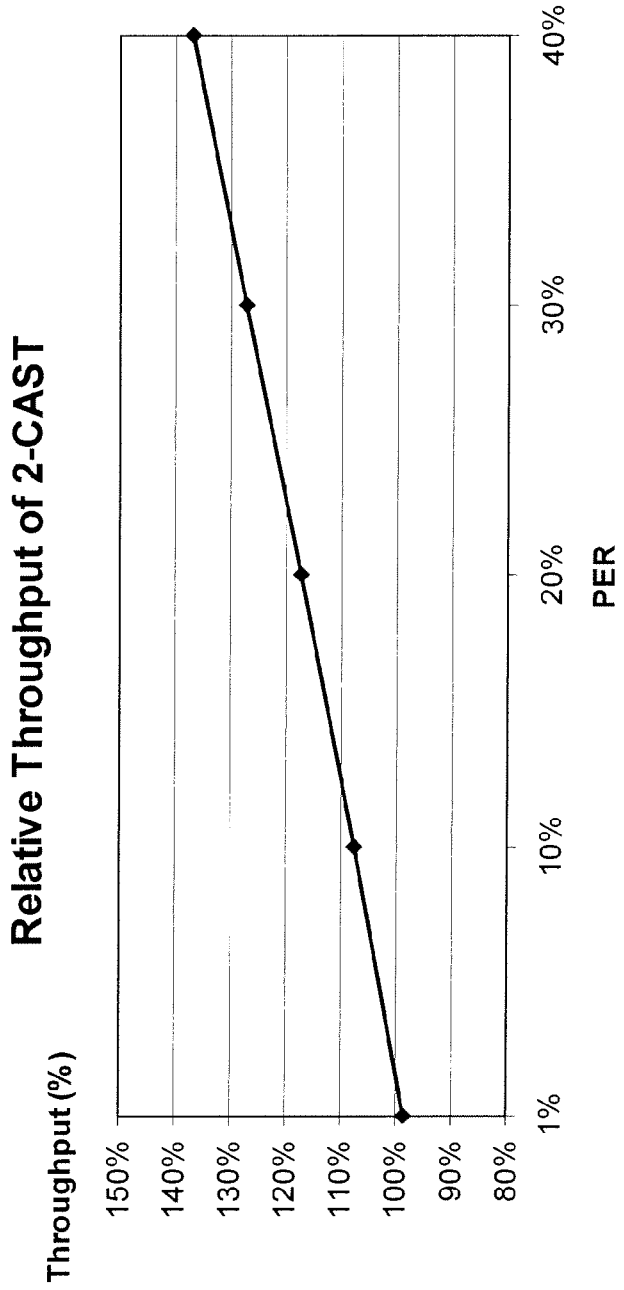
FIG. 13 illustrates an example of the throughput advantage of a 2-receiver, or 2-cast system, at varying PERs.

FIG. 13 illustrates the throughput advantage 419 of a 2-receiver, or 2-cast system, at varying PERs 420. As this illustrates, the multi-cast (or M-Cast) gains are greater at greater PERs 420. The example illustrated in FIG. 13 is for a burst size of eight, a packet size of 4095 and a rate of 480.

Figure 14:
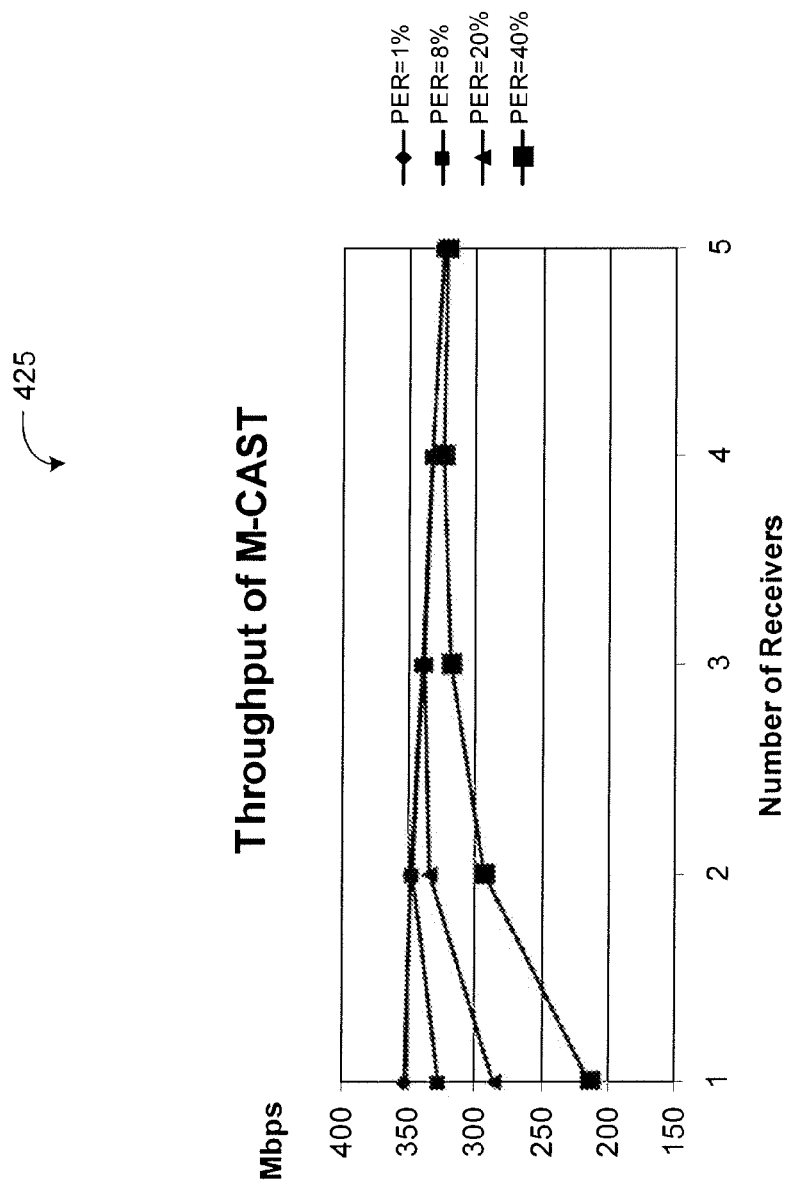
FIG. 14 is a diagram illustrating an example of the impact the number of receivers can have on throughput at various packet error rates.

FIG. 14 is a diagram illustrating an example of the impact the number of receivers can have on throughput at various packet error rates. This example assumes a burst size of eight, a packet size of 4095, and a rate of 480. As this example illustrates, higher packet error rates and can impact the performance of single receiver systems, and as additional receivers are added, increases in throughput 425 due to the systems increased ability to successfully communicate the packets even at a higher error rate. As this example also illustrates, a greater number of receivers 427 can impact throughput gains by overhead associated with multiple receiver systems as well as packet duplication that may occur in a multiple receiver system. For example, with a very low packet error rate of 1%, increasing the number of receivers, even from one receiver to two receivers, impacts the throughput of the system. As this diagram further illustrates, a packet error rate of 8% in this example, optimum throughput is obtained with two receivers. As this example of FIG. 14 serves to illustrate, one of ordinary skill in the art after reading this description can model system performance and predict an optimal number of receivers based on burst size, packet size, rate, packet error rate and so on.

Accordingly, receiver configurations can be determined in advance or at system implementation, or they can be dynamically adjusted as network conditions change and impact the communication channels. For example, the system can be set up to monitor channel conditions and packet error rates in real-time and to make adjustments to the number of receivers that are brought online depending on channel conditions. Thus, for example, a dynamic system can be implemented to attempt to optimize performance based on changing conditions. A further example, consider operation of endoscopic camera in an operating theater wirelessly communicating streaming video packets to associated monitor. In an operating theater with low levels of interference system can select a unicast, or single receiver, system to obtain maximal throughput in this low noise environment. However, if the levels of noise in the operating theater increase such as, for example, due to increased electromagnetic interference from other operating room equipment being brought online, the system can be configured to detect these changing channel conditions bring additional receivers online to change from a unicast system to a multiple-receiver system. This can also be done to change from a multiple receiver system having M receivers to a system having a greater or fewer number of receivers depending on changing channel conditions. Likewise, the system can be configured to evaluate other operating parameters such as burst size, packet size, data rate, and so on and adjust the number of receivers to increase throughput based on this criteria. In yet another embodiment, the system can be configured to set a number of receivers, major throughput, adjust the number of receivers, re-measure throughput, and continue this process iteratively to determine a preferred number of receivers based on throughput.

Figure 15:
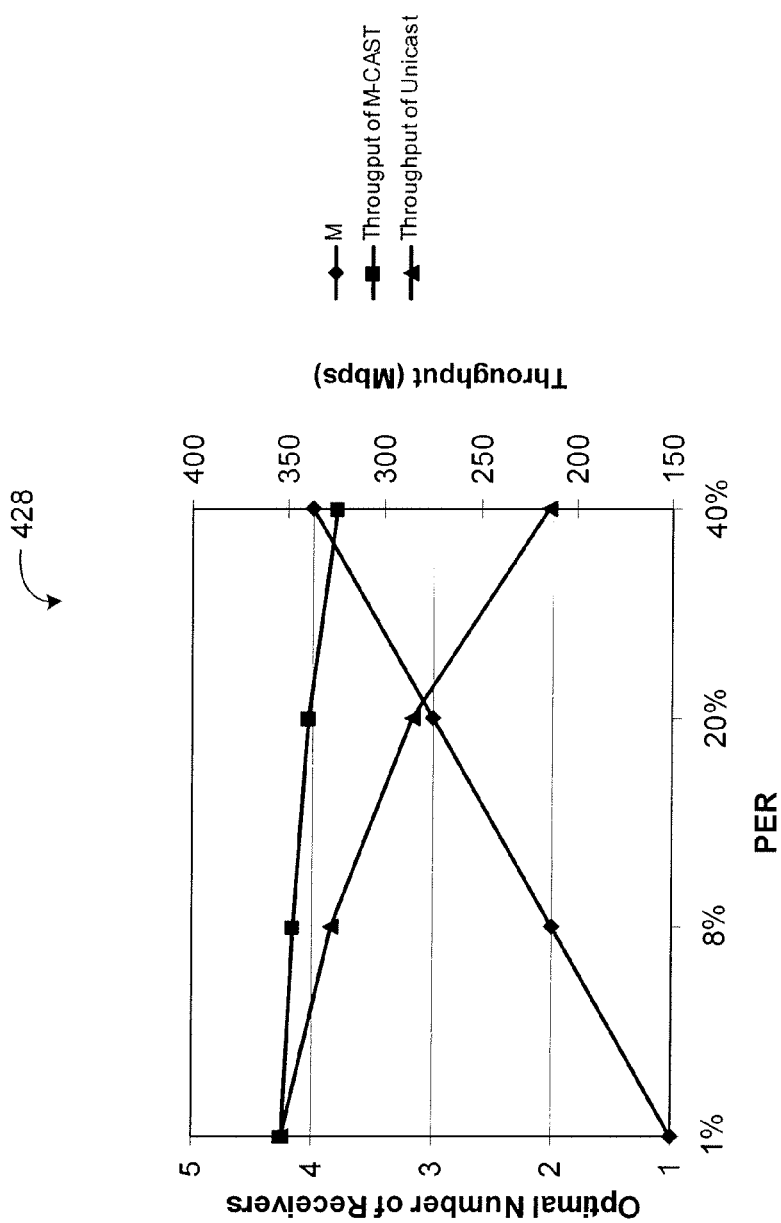
FIG. 15 is a diagram illustrating an example of an optimal number of receivers, M, as a function of PER 431.

FIG. 15 is a diagram illustrating an example of an optimal number of receivers, M, as a function of PER 431. As this diagram 428 illustrates, at a low packet error rate throughput of a single receiver system is high and M=1 is the optimal number of receivers. Conversely, at a high packet error rate of 40%, M=4 is the optimal number of receivers.

Figure 16:
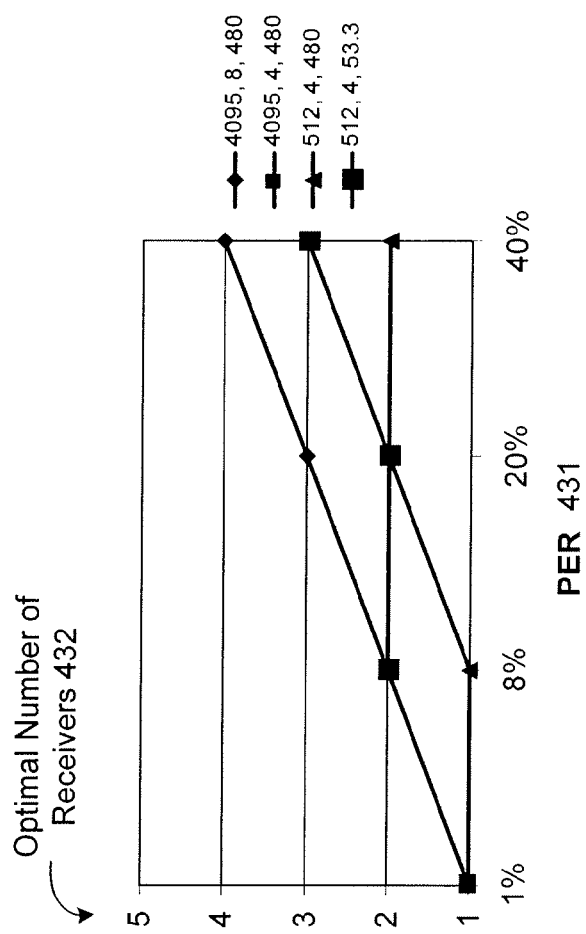
FIG. 16 is a diagram illustrating an example of the impact of packet size, burst size, and PHY rate on the optimal number of receivers, M, in accordance with the systems and methods described herein.

FIG. 16 is a diagram illustrating an example of the impact of packet size, burst size, and PHY rate on the optimal number of receivers, M, in accordance with the systems and methods described herein. Referring now to FIG. 16, as packet and burst size go down or PHY rate goes up, a higher PER 431 is required to justify the overhead of using more receivers 432.

Figure 17:
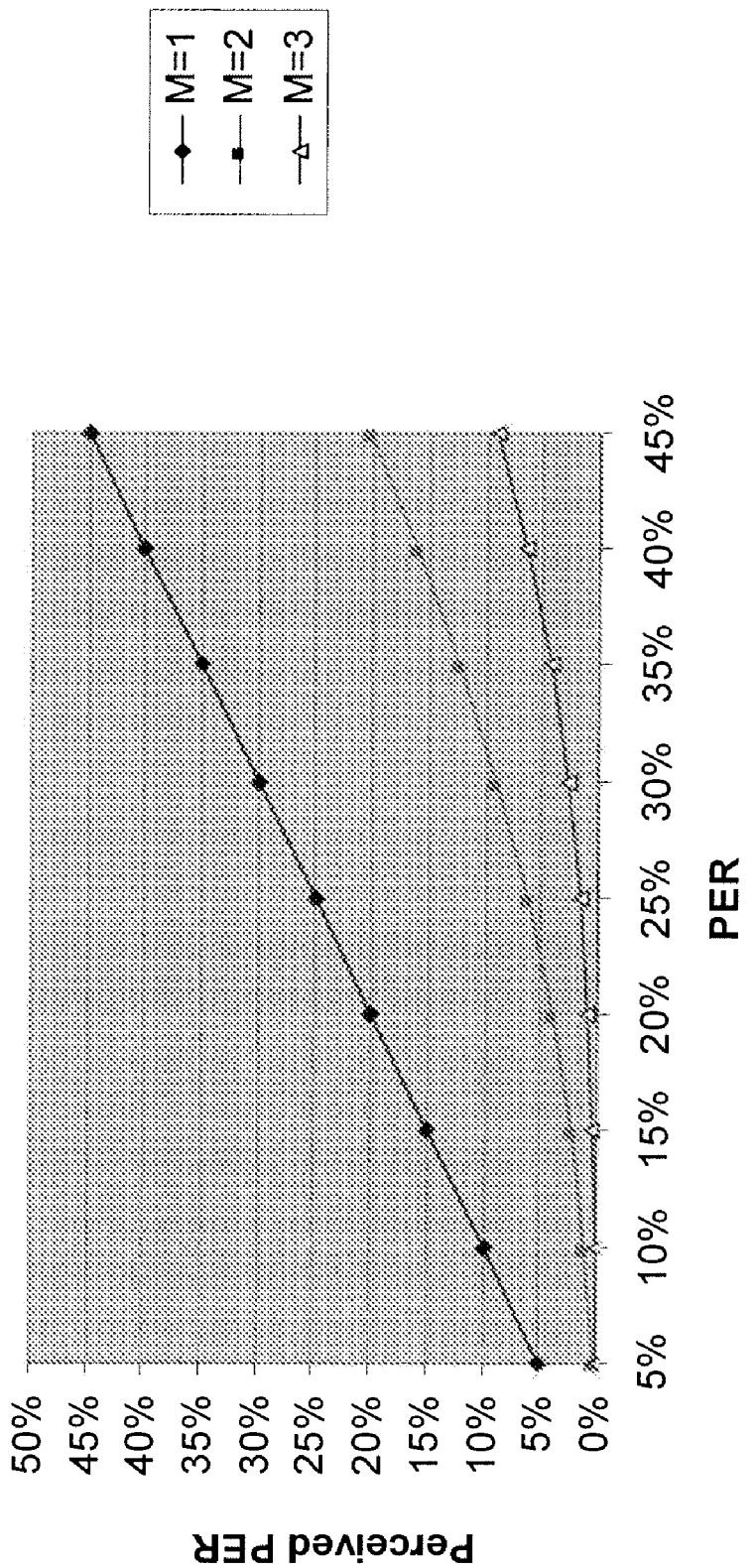
FIG. 17 is a diagram illustrating an example of reduction in perceived PER as a function of the number of receivers in accordance with one embodiment of the systems and methods described herein.
Figure 18:
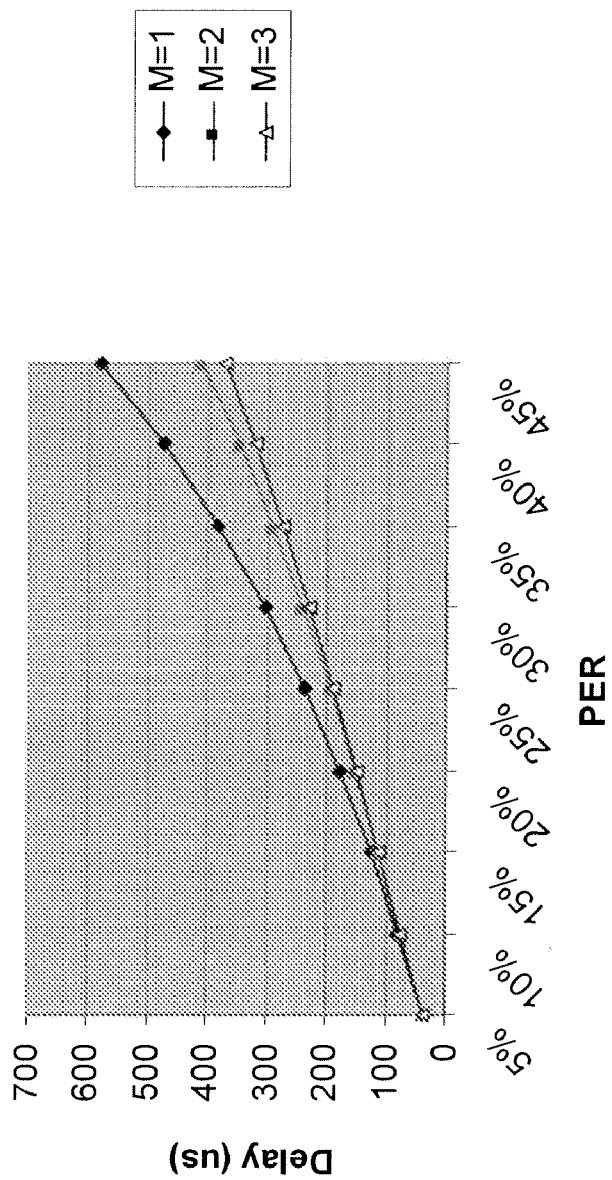
FIG. 18 is a diagram illustrating an example of delay reduction in accordance with an embodiment of the systems and methods described herein.

FIG. 17 is a diagram illustrating an example of reduction in perceived PER as a function of the number of receivers 442 accordance with one embodiment of the systems and methods described herein. Referring now to FIG. 17, in some embodiments, the multi-receiver systems reduce the PER 431 perceived by the platform client by a large amount. For example, for an M-CAST system $P_{M-CAST}=p^M$.

A multi-receiver system can also In some examples, a random variable X can be defined as the number of additional bursts required for retransmission of a given packet. If p is the PER, then: $P\{X=0\}=(1-p)$; $P\{X=1\}=(1-p)*p$; $P\{X=2\}=(1-p)*p^2$; and $P\{X=k\}=(1-p)*p^k \rightarrow X$ has a geometric distribution. Accordingly, in one embodiment, $$E\{X\} = \frac{p}{1-p}.$$

The mean value of X multiplied by the burst length represents the average delay of a packet. FIG. 7 is a diagram illustrating an example of delay reduction 450 in accordance with one embodiment of the systems and methods described herein. Referring now to FIG. 16, the results may be used to compare the average delay of a packet in a multicast, or M-CAST, system with that of a traditional one-receiver system. As illustrated in FIG. 16, increasing the number of receivers from one to two decreases the delay by about 200 microsecond, or approximately 30%, at a PER 431 of 45%. In the example of FIG. 16, the burst size is eight, the packet size is 4095, and the rate is 480.

Figure 19:
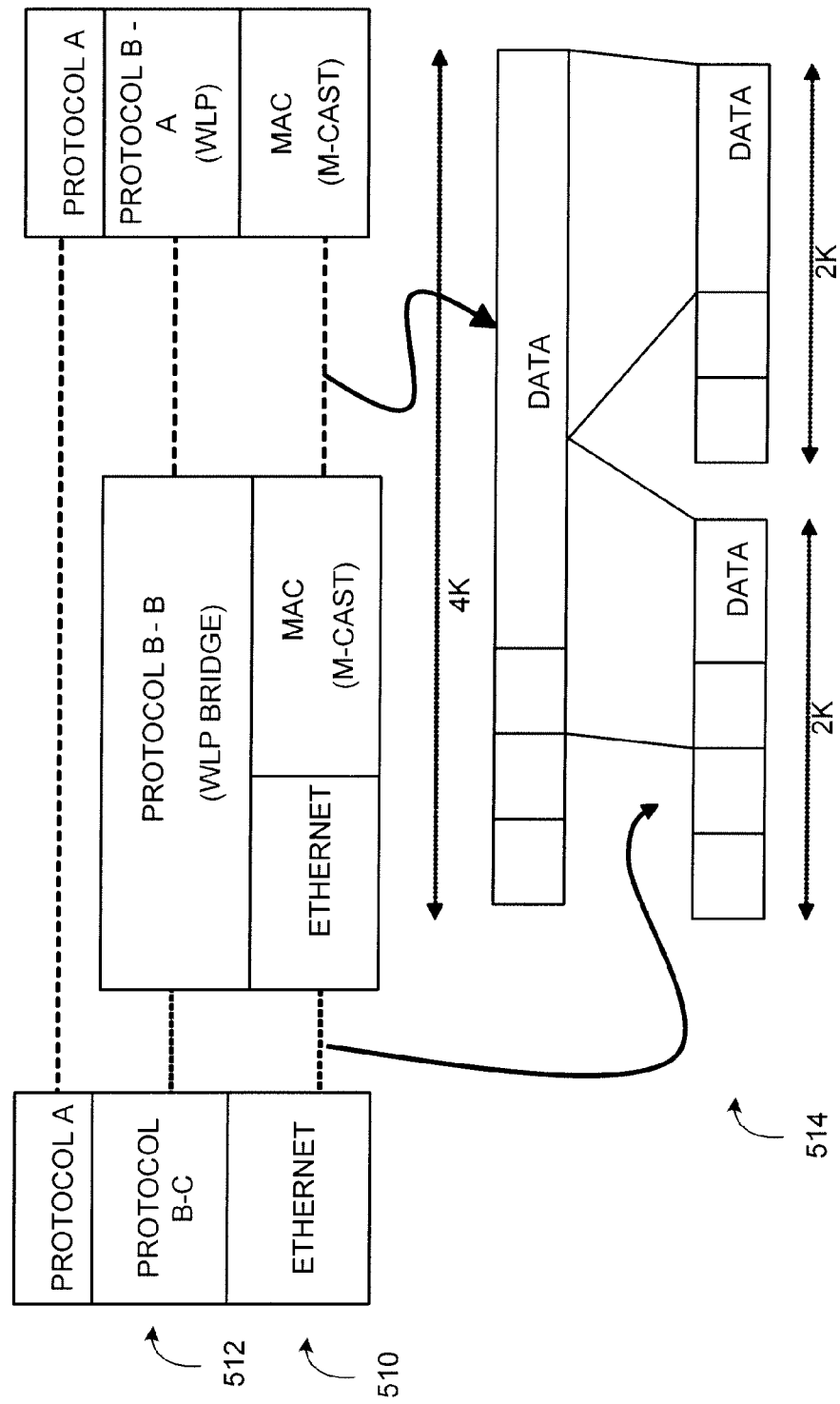
FIG. 19 is a diagram illustrating an example of duplicate detection in accordance with one embodiment of the systems and methods described herein.

FIG. 19 is a diagram illustrating an example of duplicate detection in accordance with one embodiment of the systems and methods described herein. Referring now to FIG. 19, in some embodiments, MAC headers may be stripped at the MAC level 510. Accordingly, information contained in the transport layer header, the layer 512 above the MAC, is used in one embodiment so that multiple MAC packets 514 may be forwarded to the MAC client duplicate detection and ordering performed. In some embodiments, various systems may have one or more layers on top of the MAC. Using a multicast protocol, multiple copies and out of order packets may be received; a transport protocol on top of the multicast can be responsible for duplicate detection and reordering.

If the source MAC divides an MAC Service Data Unit (MSDU) into smaller MAC Protocol Data Units (MPDUs), then, using information in MAC header, the receiving MAC must reconstruct the original MSDU before handing it to its client. Because MAC headers are stripped at the MAC level, combing MPDUs from different receivers is not possible at the client level from multiple MACs, and each MAC must receive all MPDUs before reconstructing the MSDU. In some cases, fragmentation has to be done at a layer above the MAC; a layer that can communicate with its peer at the point where duplicates are to be detected (i.e., an end-to-end layer)

In various embodiments of the systems and methods described herein, the MAC superframe may be divided in to 256 Medium Access Slots (MAS). Each reservation can comprise one or more reservation blocks of contiguous MAS and the MAC might not support acknowledged multicast. In a DRP reservation of type "Private," the access method is not specified in the WiMedia MAC and is left to the MAC client. The M-CAST protocol may be used within Private DRP reservations, and is specifically designed for scenarios similar to the one explained in the previous slide.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this section prevails over the definition that is incorporated herein by reference.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 20:
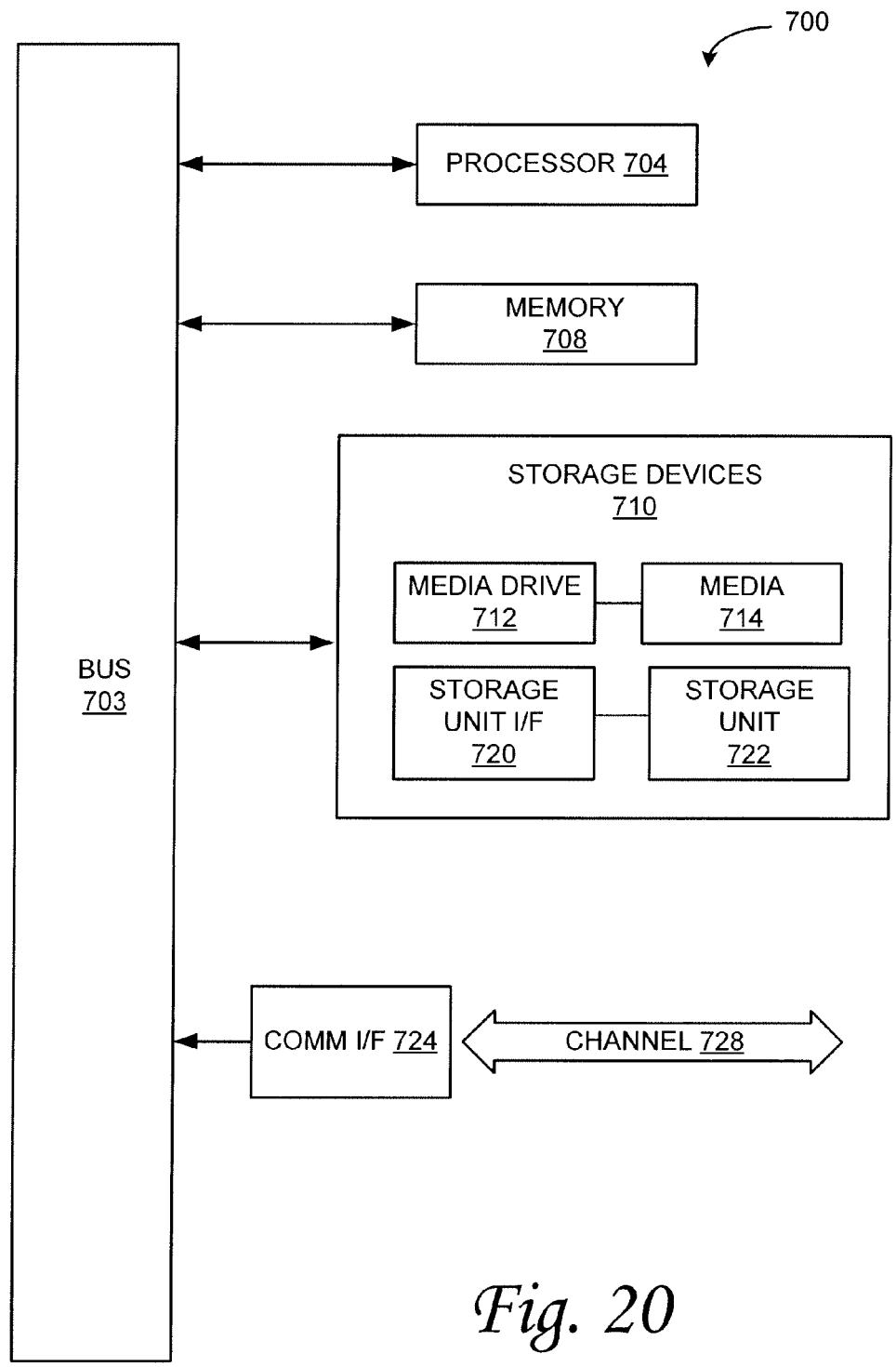
FIG. 20 is a diagram illustrating an example processing system in accordance with one embodiment of the systems and methods described herein.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 20. Various embodiments are described in terms of this example-computing module 700. After reading this description, it will become apparent to a person skilled in the relevant art how to implement the invention using other computing modules or architectures.

Referring now to FIG. 20, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the example illustrated in FIG. 20, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714, might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card. Storage units 722 and interfaces 720 can also include other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals. Additionally, the channel 728 might be implemented using a wired or wireless communication medium. These signals can deliver the software and data from memory or other storage medium in one computing system to memory or other storage medium in computing system 700. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 708, storage unit 720, and media 714. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of transmitting packet data across a network comprising:
　a transmitting network device establishing a reservation to transmit traffic to a plurality of wireless receiving network devices across a network;
　the transmitting network device transmitting a sequence of packets across the network, wherein a packet of the sequence of packets includes data requesting the plurality of wireless receiving network devices acknowledge receipt of the packet;
　the transmitting network device waiting for a predetermined time to receive acknowledgement of receipt of the packet from the plurality of wireless receiving network devices, wherein the transmitting network device transmits information identifying the plurality of wireless receiving network devices and specifying an order in which the plurality of wireless receiving network devices are to transmit their respective acknowledgements;
　the transmitting network device retransmitting a packet across the network only if it does not receive an acknowledgement for that packet from any of the plurality of wireless receiving network devices within the predetermined time; and
　a wireless receiving network device calculating a time to send its acknowledgements based on its position in the order in which the plurality of wireless receiving network devices are to transmit their respective acknowledgements.

2. The method of claim 1, wherein, the wireless receiving network device calculating a time to send its acknowledgements comprises:
　the wireless receiving network device determining its place in the order; the access controller calculating an amount of time required for any wireless receiving network devices that are earlier in the order to transmit their respective acknowledgements; and
　the wireless receiving network device determining the timeslot as a timeslot occurring a predetermined time after the amount of time calculated.

3. The method of claim 1, further comprising the transmitting network device determining a quantity of wireless receiving network devices to receive its traffic during the established reservation.

4. The method of claim 3, wherein the predetermined time is calculated based on the quantity of wireless receiving network devices to receive the traffic.

5. The method of claim 3, further comprising the wireless transmitting device transmitting an identification of wireless receiving network devices that are to receive and acknowledge the traffic.

6. The method of claim 1, wherein the order in which the plurality of wireless receiving network devices are to transmit their respective acknowledgements is configured in advance of transmitting the traffic.

7. The method of claim 1, further comprising further wireless receiving network device of the plurality of wireless receiving network devices forwarding the packet to a packet aggregator ver a wired backbone network.

8. The method of claim 7, further comprising the packet aggregator checking for duplicate packets and removing duplicate packets from packets received from the plurality of wireless receiving network devices to recreate the original sequence of packets.

9. The method of claim 8, further comprising the packet aggregator forwarding the recreated original sequence of packets to a destination device.

10. The method of claim 8, further comprising the packet aggregator reordering received packets to maintain a second order of packets transmitted by the transmitting network device.

11. The method of claim 7, further comprising the further wireless receiving network device of the plurality of wireless receiving network devices determining whether another of the plurality of wireless receiving network devices has forwarded the packet to the packet aggregator over the wired backbone.

12. The method of claim 7, wherein the further wireless receiving network device forwards the packet to the packet aggregator only if the packet has not been forwarded to the aggregator by another of the plurality of wireless receiving network devices.

13. The method of claim 7, wherein the order in which wireless receiving network devices transmit their respective acknowledgements is dynamically controlled by the packet aggregator.

14. The method of claim 1, further comprising a further wireless receiving network device of the plurality of wireless receiving network devices checking for an acknowledge signal from another wireless receiving network device acknowledging the packet and transmitting its acknowledgement only if it has not received an acknowledgement signal from another wireless receiving network device of the plurality of wireless receiving network devices.

15. The method of claim 14, further comprising the plurality of wireless receiving network devices transmitting their respective acknowledgement signals to the other of the plurality of wireless receiving network devices via a wired or wireless interface or bus.

16. The method of claim 1, wherein the packet retransmitted comprises a single packet or a group of packets covered by the data requesting acknowledgement.

17. The method of claim 1, wherein the transmitting network device is a transmitter at an endoscope that wirelessly transmits streaming packet video data to the plurality of wireless receiving network devices disposed at different locations in an operating theater, and wherein the destination device is a video display monitor.

18. The method of claim 17, wherein the plurality of wireless receiving network devices further comprise directional antennas with their respective radiation patterns directed toward a predetermined location in the operating theater.

19. A system for data communications from a transmitting network device to a receiving network device, the system comprising:
a plurality of wireless receiving network devices each comprising a receiver, a first processor coupled to the receiver and configured to execute instructions, and a first memory communicatively coupled to the processor and configured to store first program instructions, which when executed by the processor cause the plurality of wireless receiving network devices to perform the operation of receiving a packet transmitted from the transmitting network device and cause a wireless receiving network device of the plurality of wireless receiving network devices to calculate a time to send its acknowledgements based on its position in an order in which the plurality of wireless receiving network devices are to transmit their respective acknowledgements;
the transmitting network device comprising a second processor coupled to the transmitter and configured to execute instructions, and a second memory communicatively coupled to the processor and configured to store second program instructions, which, when executed by the processor cause the transmitting network device to perform the operations comprising:
establishing a reservation to transmit traffic to the plurality of wireless receiving network devices across a network;
transmitting a sequence of packets across the network, wherein a packet of the sequence of packets includes data requesting the receivers of the plurality of wireless receiving network devices acknowledge receipt of the packet;
waiting for a predetermined time to receive acknowledgement of receipt of the packet from the plurality of wireless receiving network devices;
retransmitting a packet across the network only if it does not receive an acknowledgement for that packet from any of the plurality of wireless receiving network devices within the predetermined time; and
transmitting information identifying the plurality of wireless receiving network devices and specifying the order in which the plurality of wireless receiving network devices are to transmit their respective acknowledgements.

20. The system of claim 19, wherein, a further wireless receiving network device calculating a time to send its acknowledgements comprises:
the wireless receiving network device determining its place in the order; the access controller calculating an amount of time required for any wireless receiving network devices that are earlier in the order to transmit their respective acknowledgements; and
the wireless receiving network device determining the timeslot as a timeslot occurring a predetermined time after the amount of time calculated.

21. The system of claim 19, wherein the program instructions are further configured to cause the transmitting network device to determine a quantity of wireless receiving network devices to receive its traffic during the established reservation.

22. The system of claim 21, wherein the predetermined time is calculated based on the quantity of wireless receiving network devices to receive the traffic.

23. The system of claim 21, wherein the program instructions are further configured to cause the transmitting network device to transmit an identification of wireless receiving network devices that are to receive and acknowledge the traffic.

24. The system of claim 19, wherein the order in which wireless receiving network devices are to transmit their respective acknowledgements is configured in advance of transmitting the traffic.

25. The system of claim 19, further comprising an aggregator having a processor coupled to a receiver and configured to execute instructions, and a memory communicatively coupled to the processor and configured to store third program instructions, which when executed by the processor cause the aggregator to perform the operation of receiving packets from the plurality of wireless network receiving devices and wherein the program instructions are further configured to cause a further wireless receiving network device of the plurality of wireless receiving network devices to forward the packet to a packet aggregator over a wired backbone network.

26. The system of claim 25, wherein the third program instructions are further configured to cause the packet aggregator to check for duplicate packets and remove duplicate packets from packets received from the plurality of wireless receiving network devices to recreate the original sequence of packets.

27. The system of claim 26, wherein the third program instructions are further configured to cause the packet aggregator to forward the recreated original sequence of packets to a destination device.

28. The system of claim 26, wherein the third program instructions are further configured to cause the packet aggregator to reorder received packets to maintain a second order of packets transmitted by the transmitting network device.

29. The system of claim 25, wherein the first program instructions are further configured to cause the further wireless receiving network devices to determine whether another of the plurality of wireless receiving network devices has forwarded the packet to the packet aggregator over the wired backbone.

30. The system of claim 25, wherein the first program instructions are further configured to cause the plurality of wireless receiving network devices to forward the packet to the packet aggregator only if the packet has not been forwarded to the aggregator by another of the plurality of wireless receiving network devices.

31. The system of claim 25, wherein the order in which wireless receiving network devices transmit their respective acknowledgements is dynamically controlled by the packet aggregator.

32. The system of claim 19, wherein the first program instructions are further configured to cause a further wireless receiving network device to perform the operation of checking for an acknowledge signal from another receiver of another wireless receiving network device acknowledging the packet and transmitting its acknowledgement only if it has not received an acknowledgement signal from the other wireless receiving network device of the plurality of wireless receiving network devices.

33. The system of claim 32, wherein the plurality of wireless receiving network devices further comprise a bus interface and wherein the first program instructions are further configured to cause the plurality of wireless receiving network devices to transmit their respective acknowledgement signals to the other of the plurality of wireless receiving network devices via a wired or wireless interface or bus.

34. The system of claim 19, wherein the packet retransmitted comprises a single packet or a group of packets covered by the data requesting acknowledgement.

35. The system of claim 19, wherein the transmitting network device is a transmitter at an endoscope that wirelessly transmits streaming packet video data to the plurality of wireless receiving network devices disposed at different locations in an operating theater, and wherein the destination device is a video display monitor.

36. The system of claim 35, wherein the plurality of wireless receiving network devices further comprise directional antennas with their respective radiation patterns directed toward a predetermined location in the operating theater.

37. A method of transmitting packet data across a network comprising:
a transmitting network device establishing a reservation to transmit traffic to a plurality of wireless receiving network devices across a network;
the transmitting network device transmitting a sequence of packets across the network, wherein a packet of the sequence of packets includes data requesting the plurality of wireless receiving network devices acknowledge receipt of the packet;
the transmitting network device waiting for a predetermined time to receive acknowledgement of receipt of the packet from the plurality of wireless receiving network devices;
the transmitting network device retransmitting a packet across the network only if it does not receive an acknowledgement for that packet from any of the plurality of wireless receiving network devices within the predetermined time;
a wireless receiving network device of the plurality of wireless receiving network devices forwarding the packet to a packet aggregator over a wired backbone network; and
one of the plurality of wireless receiving network devices determining whether another of the plurality of wireless receiving network devices has forwarded the packet to the packet aggregator over the wired backbone.

38. The method of claim 37, further comprising the packet aggregator checking for duplicate packets and removing duplicate packets from packets received from the plurality of wireless receiving network devices to recreate the original sequence of packets.

39. The method of claim 38, further comprising the packet aggregator forwarding the recreated original sequence of packets to a destination device.

40. The method of claim 38, further comprising the packet aggregator reordering received packets to maintain an order of packets transmitted by the transmitting network device.

41. The method of claim 37, wherein the one of the plurality of wireless receiving network devices forwards the packet to the packet aggregator only if the packet has not been forwarded to the aggregator by another of the plurality of wireless receiving network devices.

42. The method of claim 37, wherein an order in which wireless receiving network devices transmit their respective acknowledgements is dynamically controlled by the packet aggregator.

43. A method of transmitting packet data across a network comprising:
a transmitting network device establishing a reservation to transmit traffic to a plurality of wireless receiving network devices across a network;
the transmitting network device transmitting a sequence of packets across the network, wherein a packet of the sequence of packets includes data requesting the plurality of wireless receiving network devices acknowledge receipt of the packet;
the transmitting network device waiting for a predetermined time to receive acknowledgement of receipt of the packet from the plurality of wireless receiving network devices;
the transmitting network device retransmitting a packet across the network only if it does not receive an acknowledgement for that packet from any of the wireless receiving network devices within the predetermined time;

a wireless receiving network device of the plurality of wireless receiving network devices forwarding the packet to a packet aggregator over a wired backbone network, wherein the wireless receiving network device of the plurality of wireless receiving network devices forwards the packet to the packet aggregator only if the packet has not been forwarded to the aggregator by another of the plurality of wireless receiving network devices.

44. The method of claim 43, further comprising the packet aggregator checking for duplicate packets and removing duplicate packets from packets received from the plurality of wireless receiving network devices to recreate the original sequence of packets.

45. The method of claim 44, further comprising the packet aggregator forwarding the recreated original sequence of packets to a destination device.

46. The method of claim 44, further comprising the packet aggregator reordering received packets to maintain an order of packets transmitted by the transmitting network device.

47. The method of claim 43, wherein an order in which wireless receiving network devices transmit their respective acknowledgements is dynamically controlled by the packet aggregator.

48. A method of transmitting packet data across a network comprising:

a transmitting network device establishing a reservation to transmit traffic to a plurality of wireless receiving network devices across a network;

the transmitting network device transmitting a sequence of packets across the network, wherein a packet of the sequence of packets includes data requesting the plurality of wireless receiving network devices acknowledge receipt of the packet;

the transmitting network device waiting for a predetermined time to receive acknowledgement of receipt of the packet from the plurality of wireless receiving network devices;

the transmitting network device retransmitting a packet across the network only if it does not receive an acknowledgement for that packet from any of the wireless receiving network devices within the predetermined time;

a wireless receiving network device of the plurality of wireless receiving network devices forwarding the packet to a packet aggregator over a wired backbone network, wherein an order in which the plurality of wireless receiving network devices transmit their respective acknowledgements is dynamically controlled by the packet aggregator.

49. The method of claim 48, further comprising the packet aggregator checking for duplicate packets and removing duplicate packets from packets received from the plurality of wireless receiving network devices to recreate the original sequence of packets.

50. The method of claim 49, further comprising the packet aggregator forwarding the recreated original sequence of packets to a destination device.

51. The method of claim 49, further comprising the packet aggregator reordering received packets to maintain an order of packets transmitted by the transmitting network device.

52. A method of transmitting packet data across a network comprising:

a transmitting network device establishing a reservation to transmit traffic to a plurality of wireless receiving network devices across a network;

the transmitting network device transmitting a sequence of packets across the network, wherein a packet of the sequence of packets includes data requesting the plurality of wireless receiving network devices acknowledge receipt of the packet;

the transmitting network device waiting for a predetermined time to receive acknowledgement of receipt of the packet from the plurality of wireless receiving network devices;

the transmitting network device retransmitting a packet across the network only if it does not receive an acknowledgement for that packet from any of the wireless receiving network devices within the predetermined time;

a wireless receiving network device of the plurality of wireless receiving network devices checking for an acknowledge signal from another wireless receiving network device of the plurality of wireless receiving network devices acknowledging the packet and transmitting its acknowledgement only if it has not received an acknowledgement signal from the another wireless receiving network device of the plurality of wireless receiving network devices.

53. The method of claim 52, further comprising the plurality of wireless receiving network devices transmitting their respective acknowledgement signals to the other of the plurality of wireless receiving network devices via a wired or wireless interface or bus.

* * * * *